(12) United States Patent
Gennari et al.

(10) Patent No.: US 8,091,047 B1
(45) Date of Patent: Jan. 3, 2012

(54) SYSTEM AND METHOD FOR IMPLEMENTING IMAGE-BASED DESIGN RULES

(75) Inventors: Frank E. Gennari, Berkeley, CA (US); Ya-Chieh Lai, Antioch, CA (US); Matthew W. Moskewicz, Berkeley, CA (US); Michael C. Lam, Rancho Cucamonga, CA (US); Gregory R. McIntyre, El Cerrito, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 16 days.

(21) Appl. No.: 12/644,742

(22) Filed: Dec. 22, 2009

Related U.S. Application Data

(62) Division of application No. 11/207,266, filed on Aug. 18, 2005, now Pat. No. 7,653,892.

(60) Provisional application No. 60/602,800, filed on Aug. 18, 2004, provisional application No. 60/602,899, filed on Aug. 18, 2004, provisional application No. 60/602,901, filed on Aug. 18, 2004.

(51) Int. Cl.
*G06F 17/50* (2006.01)
(52) U.S. Cl. .............. 716/50; 716/54; 716/55
(58) Field of Classification Search .......... 716/50, 716/54, 55
See application file for complete search history.

(56) References Cited

U.S. PATENT DOCUMENTS

| | | | |
|---|---|---|---|
| 6,804,394 B1 | 10/2004 | Hsu | |
| 6,902,855 B2 | 6/2005 | Peterson et al. | |
| 7,752,584 B2 | 7/2010 | Yang | |
| 2003/0192013 A1* | 10/2003 | Cote et al. | 716/2 |
| 2004/0076323 A1* | 4/2004 | Fujii et al. | 382/151 |
| 2004/0202355 A1 | 10/2004 | Hillhouse | |
| 2005/0044514 A1* | 2/2005 | Wu et al. | 716/5 |
| 2005/0198602 A1 | 9/2005 | Brankner | |

OTHER PUBLICATIONS

Non-Final Office Action dated Oct. 6, 2011 for U.S. Appl. No. 12/644,789.

* cited by examiner

*Primary Examiner* — Vuthe Siek
*Assistant Examiner* — Magid Dimyan
(74) *Attorney, Agent, or Firm* — Vista IP Law Group, LLP

(57) ABSTRACT

Systems and methods for creating and implementing two-dimensional (2D), image-based design rules (IBDRs) are disclosed. Techniques for creating 2D IBDR can include identifying a search pattern that is representative of a 2D pattern of interest of a design, creating a pattern representation based on the search pattern, defining an anchor point for the pattern representation, and assigning weights to elements of the pattern representation. The 2D MDR can be used in systems and method for searching a design by comparing the 2D IBDR to the design. A number of 2D IBDRs can be merged into a subset of similar 2D IBDRs by characterizing desired rule geometries, sorting the 2D IBDRs into groups according to the desired rule geometries, merging the groups of 2D IBDRs into a single representative search pattern. Additionally, standard design rules can be created from the disclosed 2D IBDRs. The standard design rule can be created from a 2D pattern of interest by defining an origin of a shape within the 2D pattern of interest, identifying features within the 2D pattern of interest, deriving parameters relative to the origin for each of the identified features, and writing the standard design rule script using the derived parameters.

20 Claims, 16 Drawing Sheets

| Design Rule ID 710 | Bad Pattern 720 | Suggested Patterns 730 | Configuration Information 740 |
|---|---|---|---|
| N |  |  | thresh=0.99; layer=5; growAmt=10;growW=0 |
| N+1 | 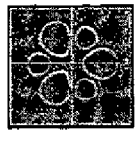 | 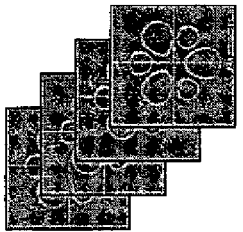 | thresh=0.80; x=50;y=50; layer=1; |
| . . . | . . . | . . . | . . . |
Figure 7

SYSTEM AND METHOD FOR IMPLEMENTING IMAGE-BASED DESIGN RULES

CROSS-REFERENCE TO RELATED APPLICATIONS

This application is a Divisional of U.S. Non-Provisional application Ser. No. 11/207,266, filed Aug. 18, 2005 now U.S. Pat. No. 7,653,892, which claims the benefit of priority from U.S. Provisional Patent Application No. 60/602,800, filed Aug. 18, 2004 and entitled "System and Method for Implementing Image-Based Design Rules Using Pattern-Matching for Effective Design for Manufacturability of Semiconductors,"; and U.S. Provisional Patent Application No. 60/602,899, filed Aug. 18, 2004, entitled "System and Method for Determining Across Chip Critical Feature Variation Using Pattern Matching," which are fully incorporated herein by reference for all purposes.

This application claims the benefit of priority from U.S. Provisional Patent Application No. 60/602,901, filed Aug. 18, 2004 and entitled "System and Method for Augmenting Optical Proximity Correction (OPC) Using Pattern Matching," which is fully incorporated herein by reference for all purposes.

This application is related to U.S. patent application Ser. No. 11/207,267, filed on Aug. 18, 2005, entitled "System and Method for Analysis and Transformation of Layouts using Situations", which is fully incorporated herein by reference for all purposes.

This Application is related to and disclosed in U.S. application Ser. No. 12/644,647, entitled "SYSTEM AND METHOD FOR IMPLEMENTING IMAGE-BASED DESIGN RULES", and U.S. application Ser. No. 12/644,789, entitled "SYSTEM AND METHOD FOR IMPLEMENTING IMAGE-BASED DESIGN RULES", both filed concurrently with the present application, the contents of which are incorporated by reference in their entirety.

BACKGROUND OF THE INVENTION

1. Field of the Invention

The present invention relates generally to systems, methodologies and techniques for improving designs for manufacturability of semiconductors, and more particularly relates to systems, methodologies and technologies for automatically identifying and eliminating high risk configurations of shapes within a semiconductor layout.

2. Description of the Related Art

Traditionally, semiconductor design for even modestly complex semiconductors has involved the use of a series of masks, layered one on top of the other, to represent the completed design, where each mask represents a processing step. The impact of even small errors in the design (such as those errors on the order of nanometers) of a single mask can propagate to the complete failure of an entire design. It has therefore become important that the design of individual masks be optimized against such errors even before fabrication of the semiconductor begins.

To avoid such costly errors, a semiconductor manufacturer typically implements a fairly complex series of design rules. Design rules help the manufacturer to minimize the design errors of individual masks. Historically, these design rules were developed from empirical data. Over time, specific tools have been developed to establish and implement the various design rules, and to verify the resulting designs.

While numerous approaches have been tried for such design rules, these prior approaches have met with only limited success. Some approaches, while relatively thorough, are time-intensive and labor-intensive, and thus costly, and cannot readily be automated. Other approaches involve limited rule-based analyses which, while capable of being automated, have relatively narrow application and do not give universally reliable results.

Other typical approaches process layouts using a shape-based system, as contrasted to an image-based system, where a shape is defined by a set of associated edges in a specified configuration, for instance, as described in "General purpose shape-based layout processing scheme for IC layout modifications" invented by Agrawal et al. (U.S. Pat. No. 6,523,162 B1, granted on Feb. 18, 2003). This configuration of edges is often described as a set of one-dimensional descriptions that, taken together, might describe a two-dimensional configuration.

Thus, there exists a need for techniques to improve semiconductor design mask manufacturability that are easily implemented, offer relatively broad applicability, and include the capability of automatic operation.

SUMMARY OF THE INVENTION

The present invention presents systems and methods for creating and implementing two-dimensional (2D), image-based design rules (IBDRs). The exemplary techniques for creating 2D IDBR include identifying a search pattern that is representative of a 2D pattern of interest of a design, creating a pattern representation based on the search pattern, defining an anchor point for the pattern representation, and assigning a plurality of weights to a respective plurality of elements of the pattern representation. The 2D IBDR of the present invention can be used in systems and method for searching a design by comparing the 2D IBDR to the design.

A number of 2D IBDRs of the present invention can be merged into a subset of 2D IBDRs by characterizing one or more desired rule geometries, sorting the 2D IBDRs into one or more groups according to the one or more desired rule geometries, merging one or more of the groups of 2D IBDRs into a single representative search pattern.

Additionally, standard design rules can be created from the 2D IBDRs of the present invention. The standard design rule can be created from a 2D pattern of interest by defining an origin of a shape within the 2D pattern of interest, identifying one or more features within the 2D pattern of interest, deriving one or more parameters relative to the origin for each of the one or more identified features, and writing the standard design rule script using the one or More derived parameters.

FIGURES

These and other aspects and features of the present invention will become apparent to those ordinarily skilled in the art upon review of the following description of specific embodiments of the invention in conjunction with the accompanying figures, wherein:

FIG. 7 illustrates the identification of a "bad" pattern and alternative suggested patterns;

Figure 10B:
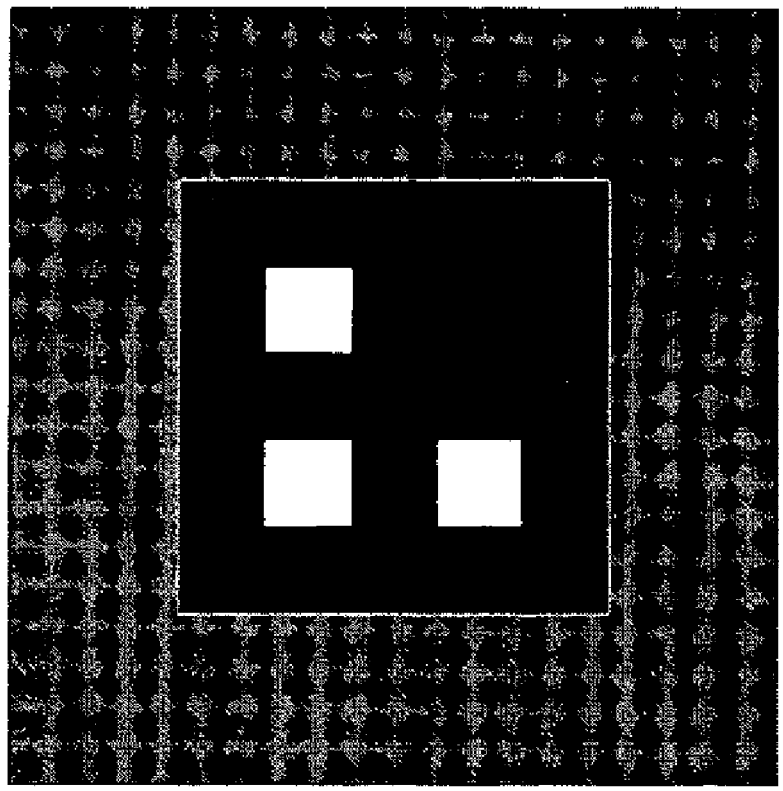
Figure 10A:
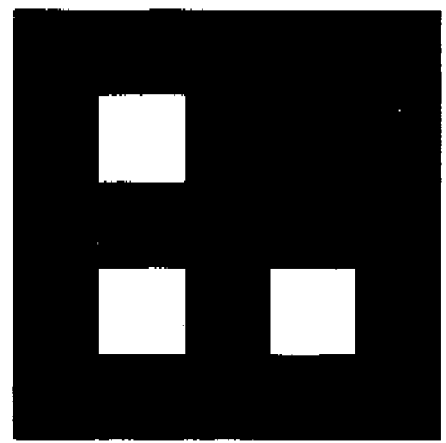
Figure 11:
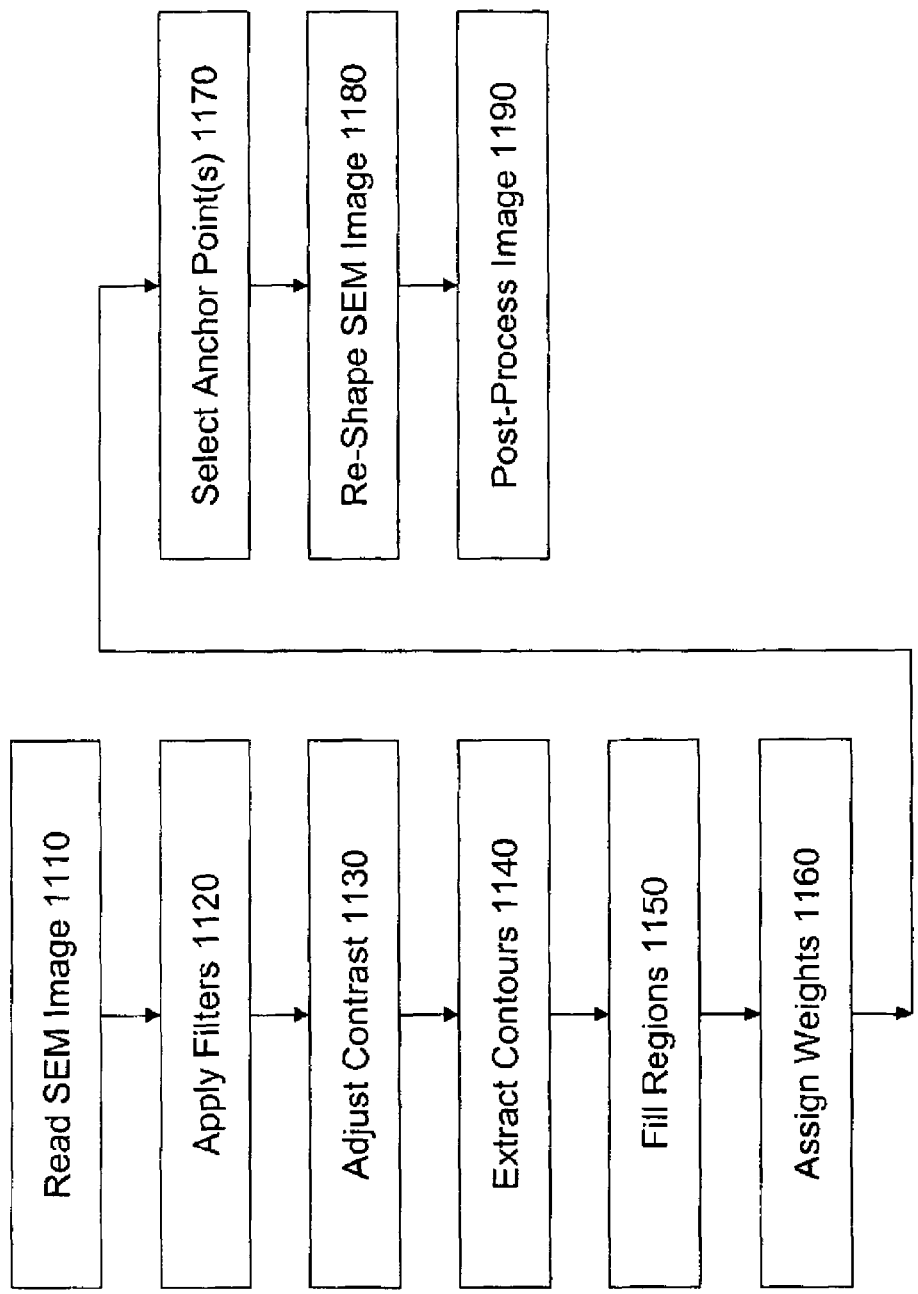
Figure 13:
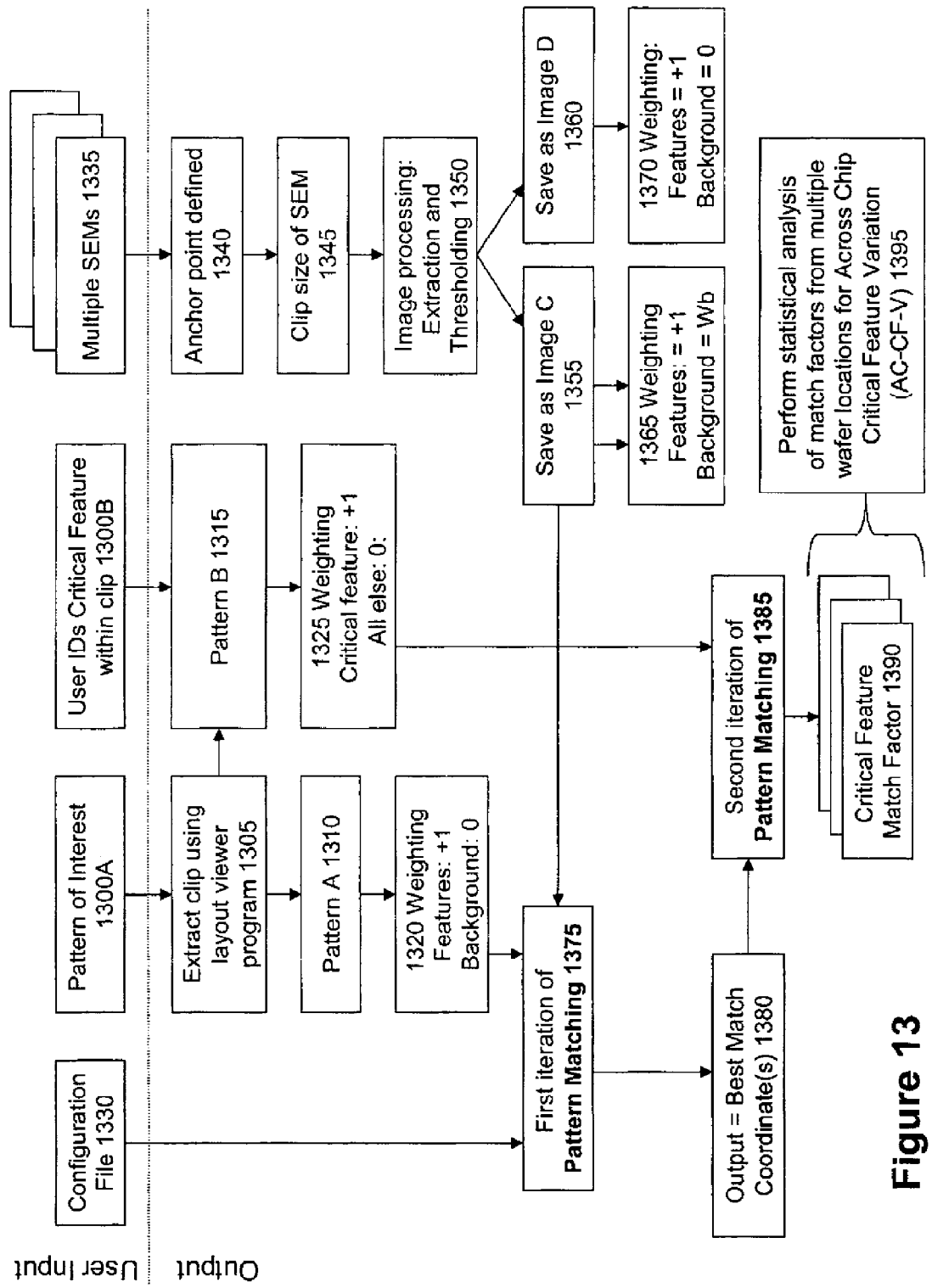
Figure 14:
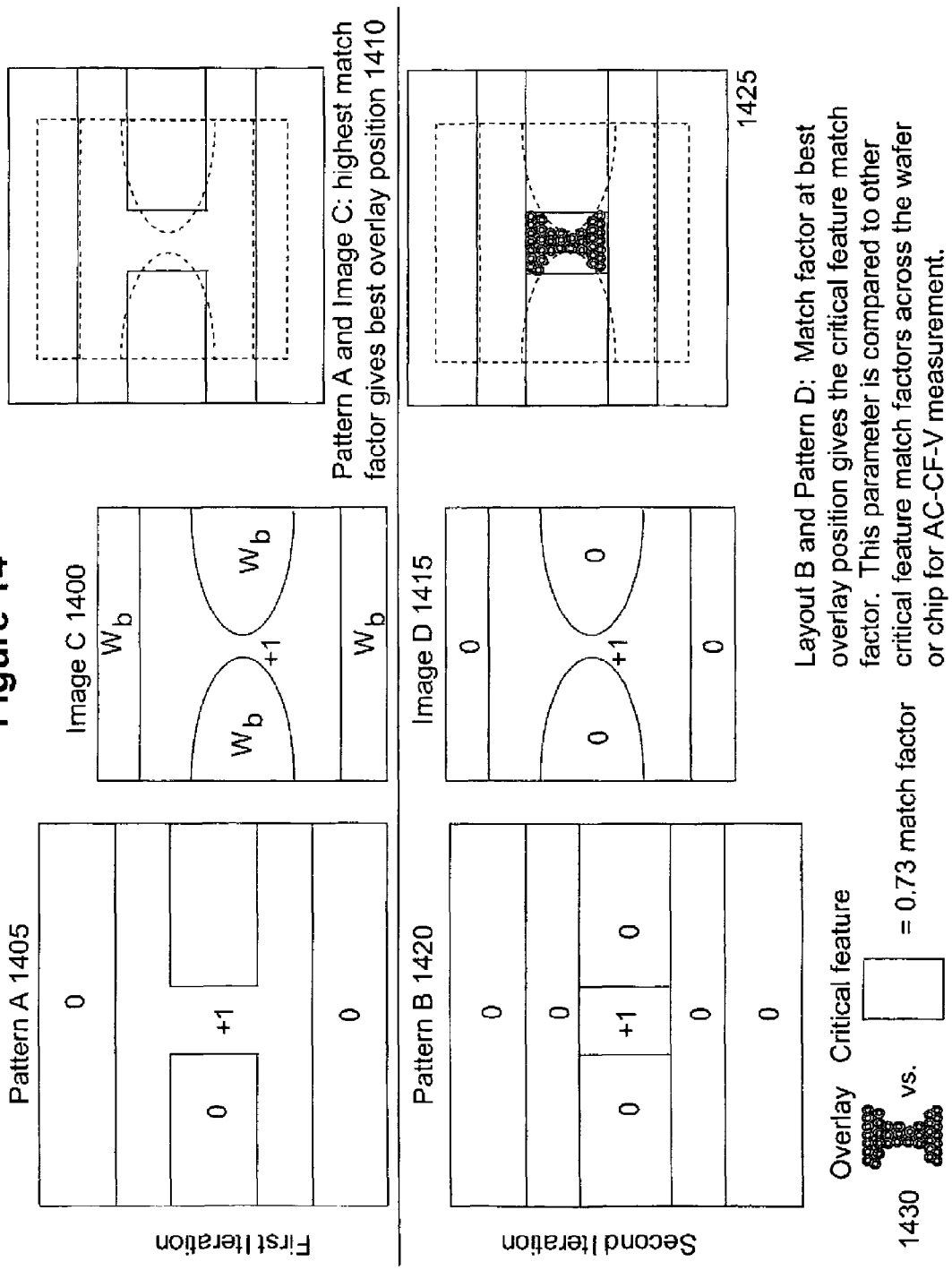
Figure 15:
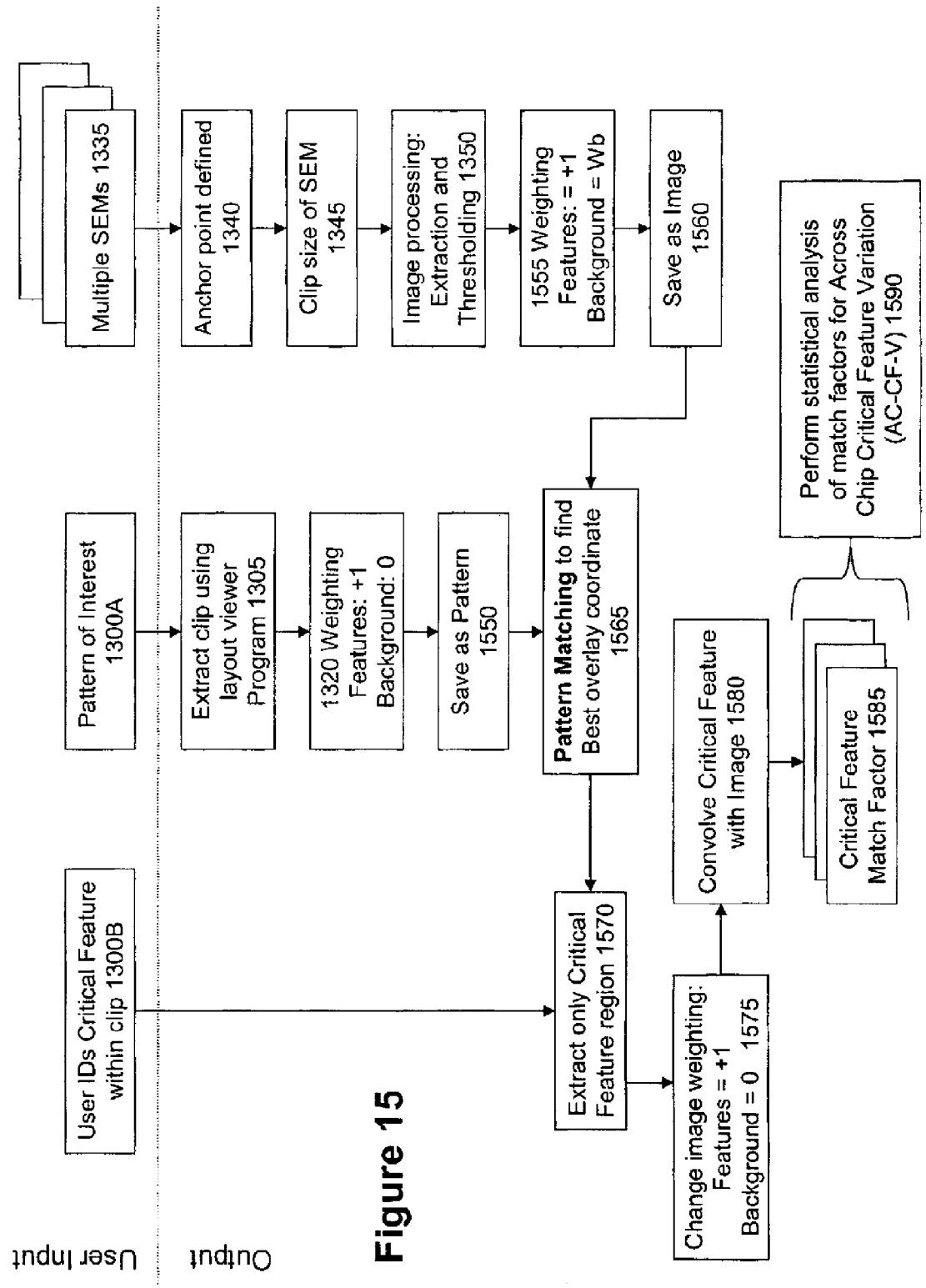
Figure 16:
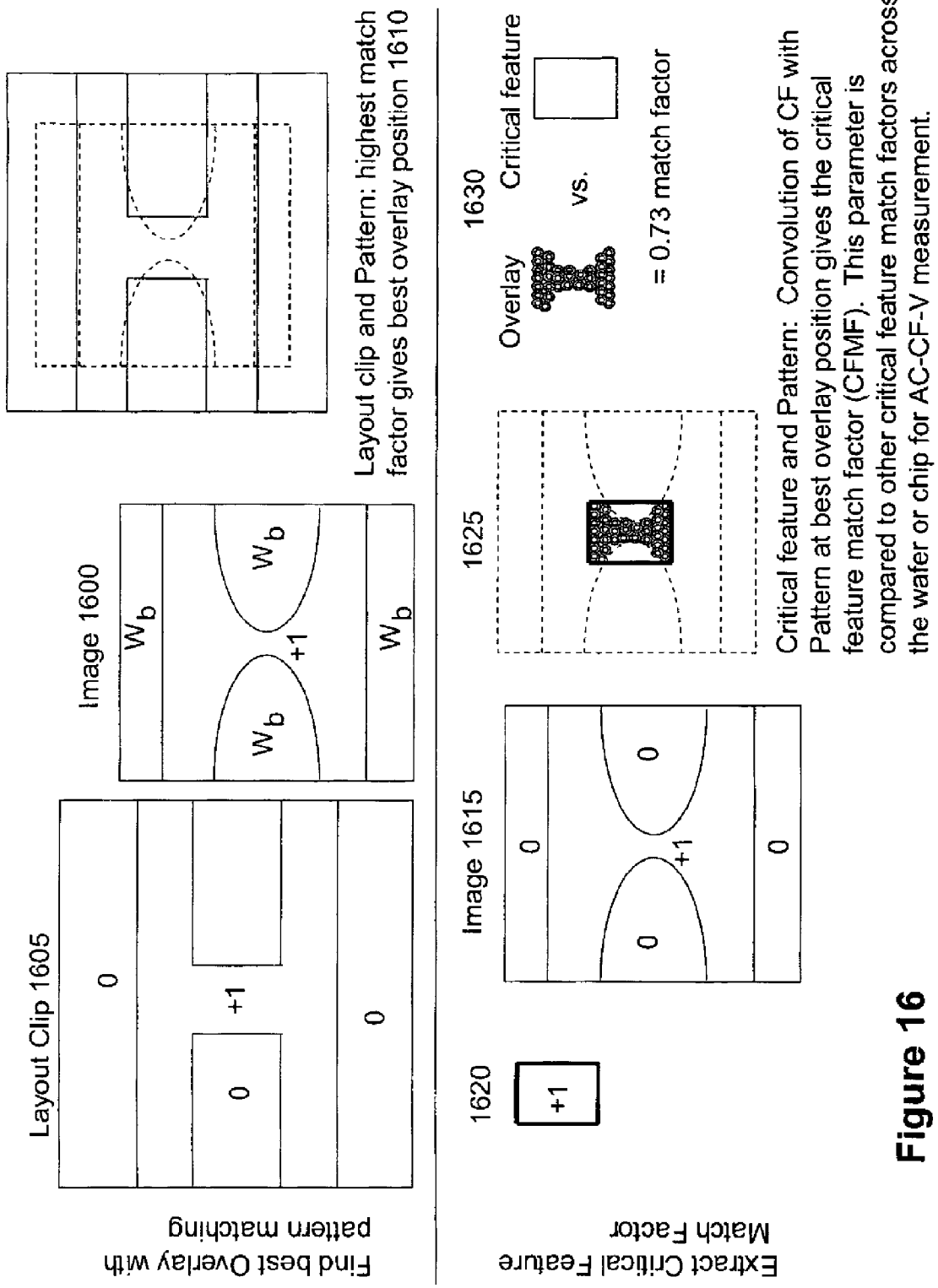

FIGS. 10A-B illustrate an example of a search shape with and without a border region in which a density calculation can be performed instead of an image correlation in accordance with the present invention;

FIG. 11 illustrates in flow diagram form an exemplary process for handling the use of SEM images to control the creation of image-based design rules and associated search patterns and metadata;

FIGS. 12A-D illustrates possible measurements that can be extracted from a sample layout clip with two shapes shown;

FIG. 13 illustrates a flow diagram for the development of a Critical Feature Match Factor (CFMF) from a single SEM measurement according to certain embodiments of the present invention (with an additional and successive SEM measurement determined in the same manner);

FIG. 14 illustrates an example of the process described in FIG. 12;

FIG. 15 illustrates a flow diagram for the development of a CFMF from a single SEM measurement according to certain embodiments of the present invention (with an additional and successive SEM measurement determined in the same manner); and FIG. 16 illustrates the iterative overlays associated with FIG. 14.

DETAILED DESCRIPTION OF THE INVENTION

The present invention will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods), only those portions of such known components (or methods) that are necessary for an understanding of the present invention will be described, and the detailed descriptions of other portions of such known components (or methods) will be omitted so as not to obscure the invention. Further, the present invention encompasses present and future known equivalents to the components referred to herein by way of illustration.

Design Overview

Figure 1:
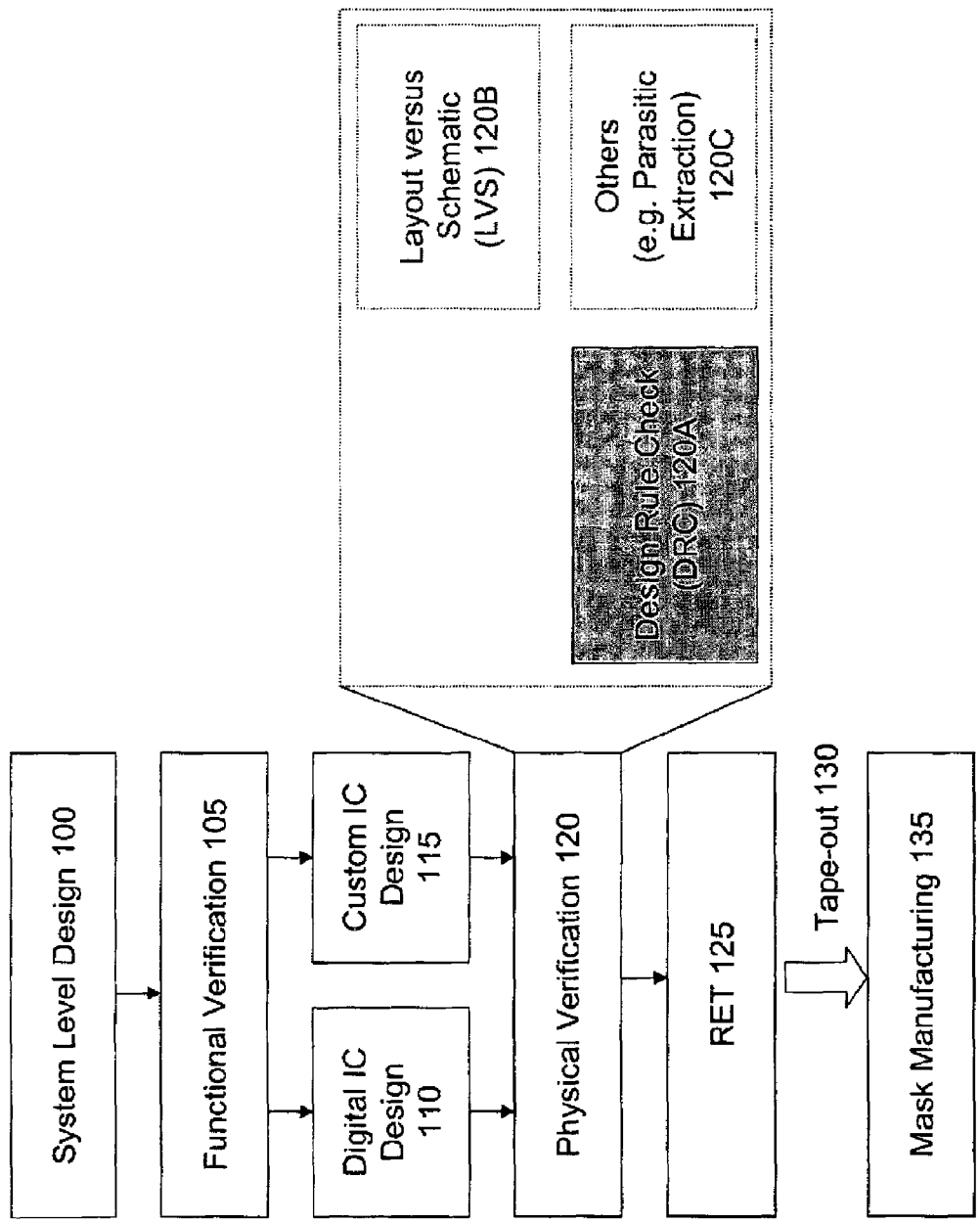
FIG. 1 illustrates in flow diagram form a generalized view of the process flow for the design of a semiconductor, including the physical verification process steps at which at least some aspects of the present invention are typically implemented.

Referring first to FIG. 1, a generalized view of the process flow for the design of a semiconductor is illustrated, including the physical verification 120 process steps at which at least some aspects of the present invention can be implemented. At an initial step 100, system level design can occur, after which a functional verification 105 may be performed. Digital integrated circuit (IC) design 110 and/or custom IC design 115 can then implemented as required.

Following the IC design steps, a physical verification 120 can be performed. The physical verification step may comprise multiple forms of validations, verifications and other checks, including, for example, design rule checks (DRC) 120A, layout versus schematic (LVS) verification 120B, and others (e.g., Parasitic Extraction) 120C. The present invention can be implemented as part of the Design Rule Checks of step 120A.

Once the physical verification is performed and the design is considered to meet the required design standards, a resolution enhancement techniques (RET) step 125 can be performed. RET is the general name for a number of pre-compensation steps that can significantly improve the image contrast and pattern fidelity on the reticle. The two main RET approaches are optical proximity correction (OPC) and phase-shift masks (PSM). With OPC, the layout can be adjusted to add or subtract the necessary light to increase pattern fidelity. With PSM, topographic structures might be added to the layout to introduce contrast-enhancing fringes on the image. Following RET, tape-out 130 can be generated, followed by the creation of one or more of the design masks 135 used for manufacturing the semiconductor.

Generally speaking, there are two major styles of semiconductor design: fully-custom design and semi-custom design. By giving the designer complete control over the size and placement of transistors and conductors, the fully-custom style requires high effort, but results in the highest performance designs. In contrast, semi-custom design is often at a logic or gate level and is more time-efficient and economical for low volume designs. The one or more flows of the present invention can be encapsulated within both the fully-custom and semi-custom flows. Modem designers can choose one or the other or some combination of custom and semi-custom design based on the requirements of their product. The generalized process flow of FIG. 1, and some of the options available to a chip designer, may be appreciated in greater detail by referring to FIG. 2.

Figure 2:
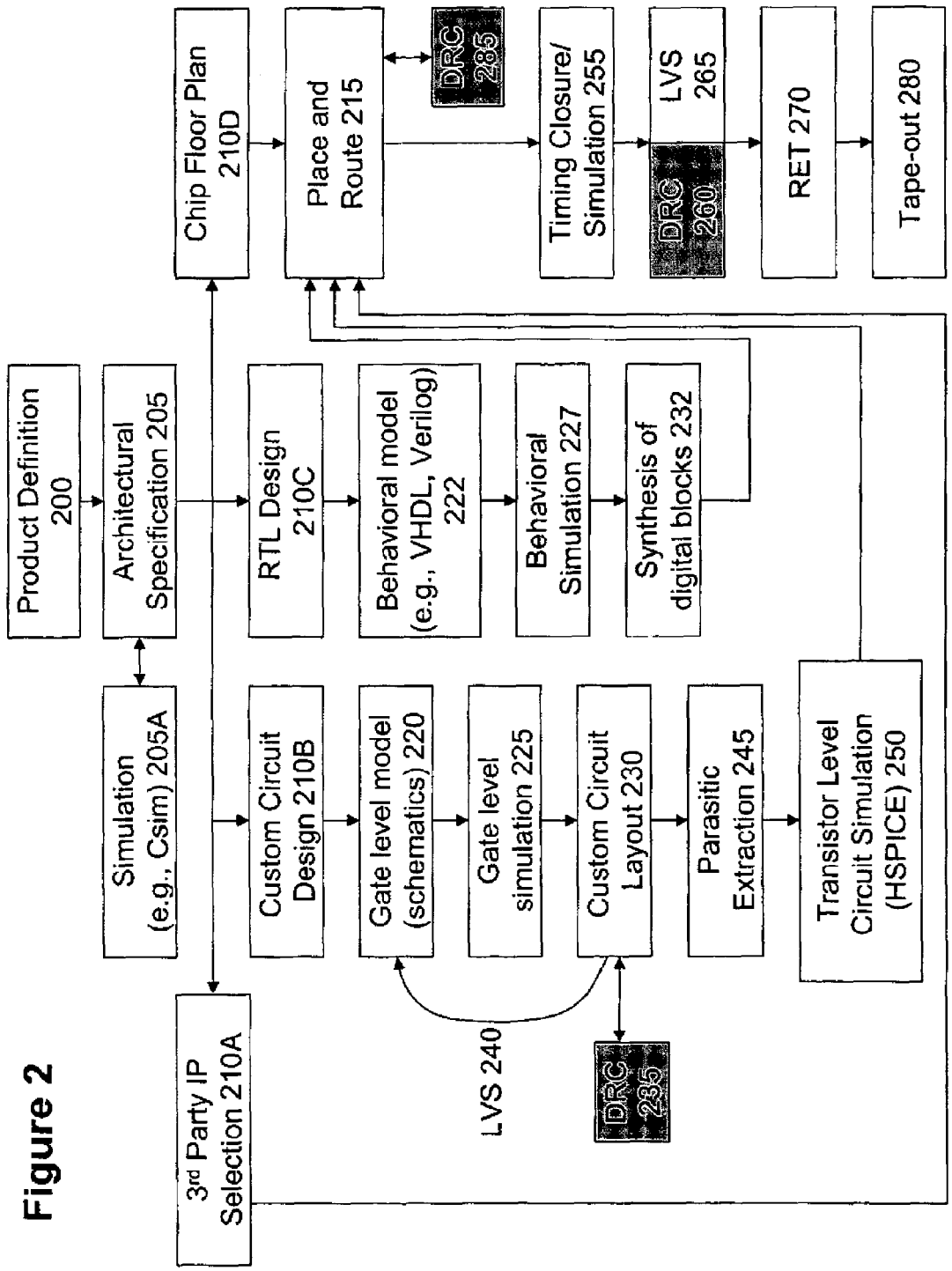
FIG. 2 illustrates in flow diagram form a more detailed view of the process flow of FIG. 1, and further incorporates manufacturing steps at which some aspects of the present invention are typically implemented.

As shown in FIG. 2, the starting point for a designer is to define a product 200, followed by development of an architectural specification 205. A system level simulation 205A, for example, one based on the C language such as Csim, may be performed at that point. However, the system level simulation is purely optional. Thereafter, the designer may select from among several options for creating the major blocks of the design. A semi-custom designer may select from third party intellectual property (IP) 210A or from a register transfer level (RTL) design 210C. A fully-custom designer might design a custom circuit 210B. The arrangement of these blocks (e.g., 3rd Party IP, RTL and/or Custom) on the chip (or die) or wafer is designed in the floor plan step 210D. Based on guidance from the floor plan design 210D, the major blocks are put down on the chip and connected in a place and route step 215.

The custom circuit design flow 210B will now be described in more detail. Based on the requirements of the custom block, a gate level model of the design may be developed 220. The gate level model 220 might involve generation of schematics, followed by a gate level simulation 225. It will be understood by those skilled in the art that numerous tools are available to the modem chip designer to assist in the development of the gate level model, schematics and simulation. The result of the gate level simulation 225 is the development of a custom circuit layout 230. At this point, checks can be performed by the chip designer, and may include both design rule checks 235 as well as layout versus schematic (LVS) 240, which can compare the circuit layout of step 230 with the gate level model at 220.

Upon satisfactory completion of one or a combination of the design rule checks 235 and/or an LVS verification 240, further verification in the form of parasitic extraction 245 may be performed for timing closure. It will be appreciated by those skilled in the art that passing each of these verification steps may require several iterations to refine the preliminary design until it satisfies the requirements of the design rules or other verification parameters. Following the parasitic extraction step 245, a transistor level circuit simulation may be performed 250, for example using HSPICE or other similar circuit simulation tool. When the results of the transistor level simulation are complete, the custom design is ready for place and route 215 as previously mentioned. At this point, further checks may be performed by the designer, including DRC 285, to ensure that no further errors have been introduced during place and route 215.

The RTL design flow 210C will now be described in more detail. Based on the requirements of the RTL block, a behavioral model of the design may be developed 222. It will be appreciated by those skilled in the art that the behavioral model may use, for example, VHDL or Verilog. The behavior model design 222 may be followed by a behavioral simulation 227. It will be understood by those skilled in the art that numerous tools are available to the modern chip designer to assist in the development of the behavioral model and simulation. The result of the behavioral simulation 227 is the synthesis of the digital blocks 232. At this point, the results of the synthesis 232 is ready for place and route 215 as previously mentioned.

The place and route step 215 puts together the complete physical layout of the semiconductor design. In essence, the building blocks from steps 210A, 210B, and 210C are placed into position on a chip, and the connections between those building blocks are then routed, or positioned on the die and wafer, to link the appropriate inputs and outputs of the building blocks. Place and route 215 can be particularly complex with many modern chip designs, and many computer-aided tools exist for performing such placement and routing. Even with such tools, the place and route step can comprise numerous iterations as the chip designer attempts to resolve power, heating, cross-talk, delay, interference and other issues associated with place and route 215.

Following the place and route step 215, a timing closure/simulation step 255 might be performed. At this point, the product manufacturers (i.e., as contrasted to the design team) can again perform a series of validations, verifications and/or other checks that might include both design rule checks 260 and LVS verification 265. Further, most modern designs require an RET step 270 following physical verification(s). This RET step 270 can improve the printability of the layout on the silicon wafer. Once those steps have been successfully completed, which may again take one or more iterations, tape-out is performed 280. The completion of tape-out can lead to the generation of a mask set, which may be used to fabricate the physical semiconductor chip(s). Thus, tape-out effectively represents the last step in the design and verification of a particular mask set, and therefore a particular version of a semiconductor.

Figure 3:
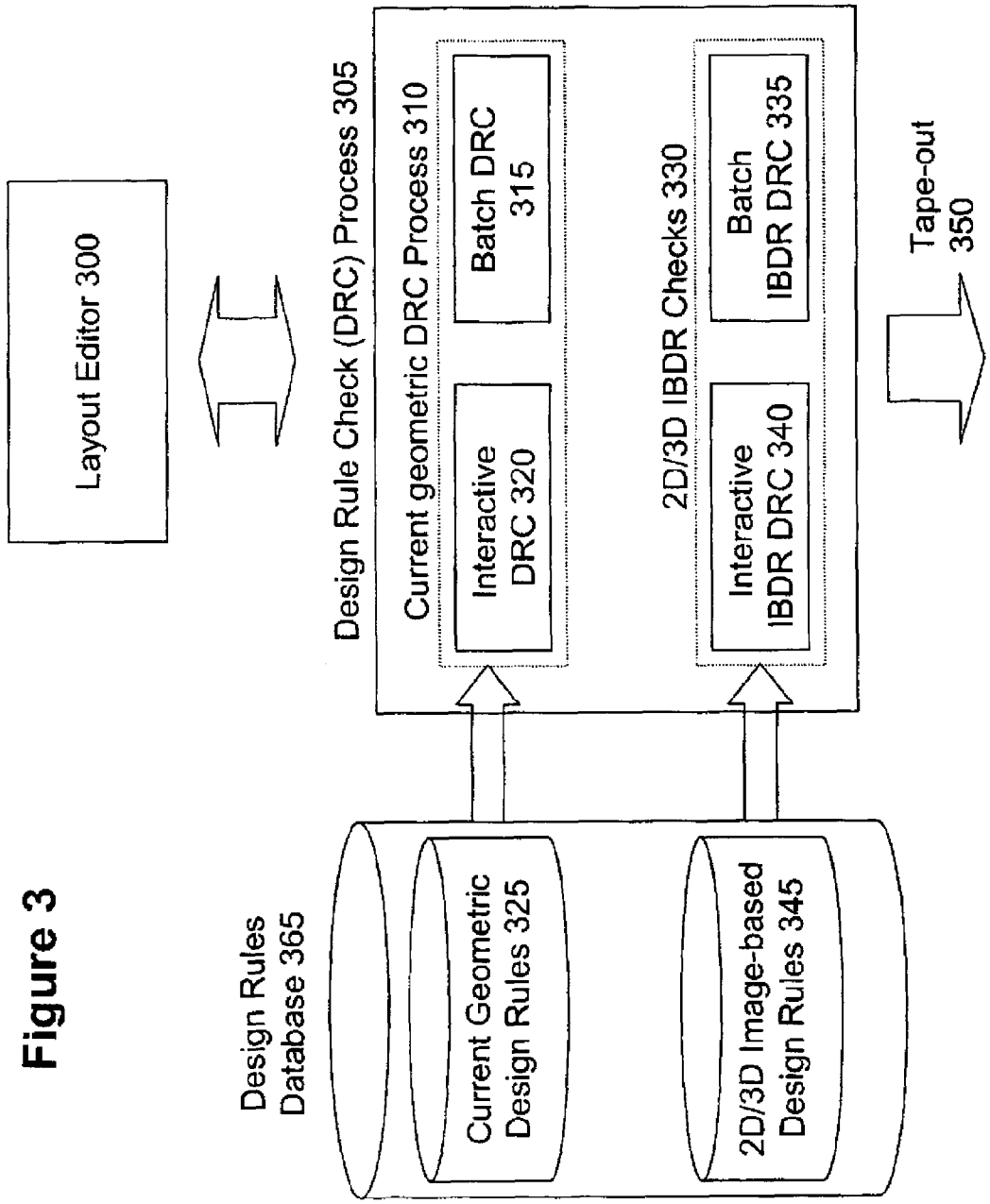
FIG. 3 illustrates in flow diagram form one approach to implementing the image-based design rules of the present invention in conjunction with other, more conventional design rules checks.

Referring next to FIG. 3, the design rule check (DRC) steps indicated at steps 235, 260 and 285 of FIG. 2 and step 120A of FIG. 1 can be appreciated in greater detail. The design, as it exists prior to performing a DRC step, can be provided by a layout editor 300, such as, for example, Cadence's Virtuoso Editor or other suitable program. It will be appreciated that the layout editor can stream out either the full design or any portion(s) thereof for the purpose of performing DRC. The design being studied is then verified, as desired, in accordance with a DRC process 305, which can make use of a design rules database 365. The conventional geometric DRC techniques 310 can be performed on the design provided by layout editor 300. This verification may be performed either in batch mode 315 or in interactive mode 320. The verification is performed in accordance with geometric design rules that can be stored, for example, in a database 325.

Either alternatively or in addition to the design rule checks of steps 315/320, certain embodiments of the present invention include image-based design rules (IBDR) checks 330. As with the geometric design rule checks, the IBDR checks may be performed either in batch mode 335 or in interactive mode 340. In either case, the image based design rules can be maintained, for example, in an IBDR database 345, which may be either the same as or a different database from the geometric design rules database 325. The IBDR checks for two-dimensional and/or three-dimensional (2D/3D) design rule violations by using image-based pattern matching. For this type of application, the search space (i.e., the integrated circuit layout or portion(s) thereof as provided by layout editor 300) is massive relative to the item to be searched. Further, the search space includes, for example, many different types of polygons. To be useful, the pattern matching algorithm(s) should be fast, should be able to use memory efficiently, and should be able to rank order by degree of similarity (i.e., a "match factor" or "MF") to the item being searched. "Method of Locating Areas in a Mask Layout that are Sensitive to Residual Processing Effects" invented by Frank E. Gennari (U.S. patent application Ser. No. 10/716, 266, filed on Nov. 17, 2003) describes a number of exemplary algorithms for this type of pattern matching operation and is fully incorporated herein by refer.

In the IBDR interactive mode 340 according to certain embodiments of the invention, the user can see the IBDR design rule checks (DRC) violations within the layout editor 300, for example, in a highlighted form. This permits the user to interactively find the violations, suggest fixes, and/or allow for automatic correction of errors in the layout. In IBDR batch mode of embodiments of the invention, the IBDR design rule check can be run, for example, from the command line or as part of a script. Such a script may call multiple IBDR design rule checks and may also call other verification programs.

Errors found in the design rule checking process 305 can be stored in a file for future reference, analysis and correction. If no errors are found, the design is considered to be DRC clean. The DRC may be run as part of the final verification for a design or may be run on an iterative or recurring basis, for example daily or weekly, to verify the design incrementally. If design rule errors or violations are found, the DRC process 305 may go back to the layout editor for correction of the design, after which the design rule check process 305 can be rerun. One or more iterations may be required to confirm that the design complies with the design rules 325, 345. When the design is considered in compliance, the DRC process 350 can advance the design to tape-out 350. Alternatively, the design could be released for further processing by other means, for example, through the use of resolution enhancement techniques such as optical proximity correction (not shown).

Figure 4:
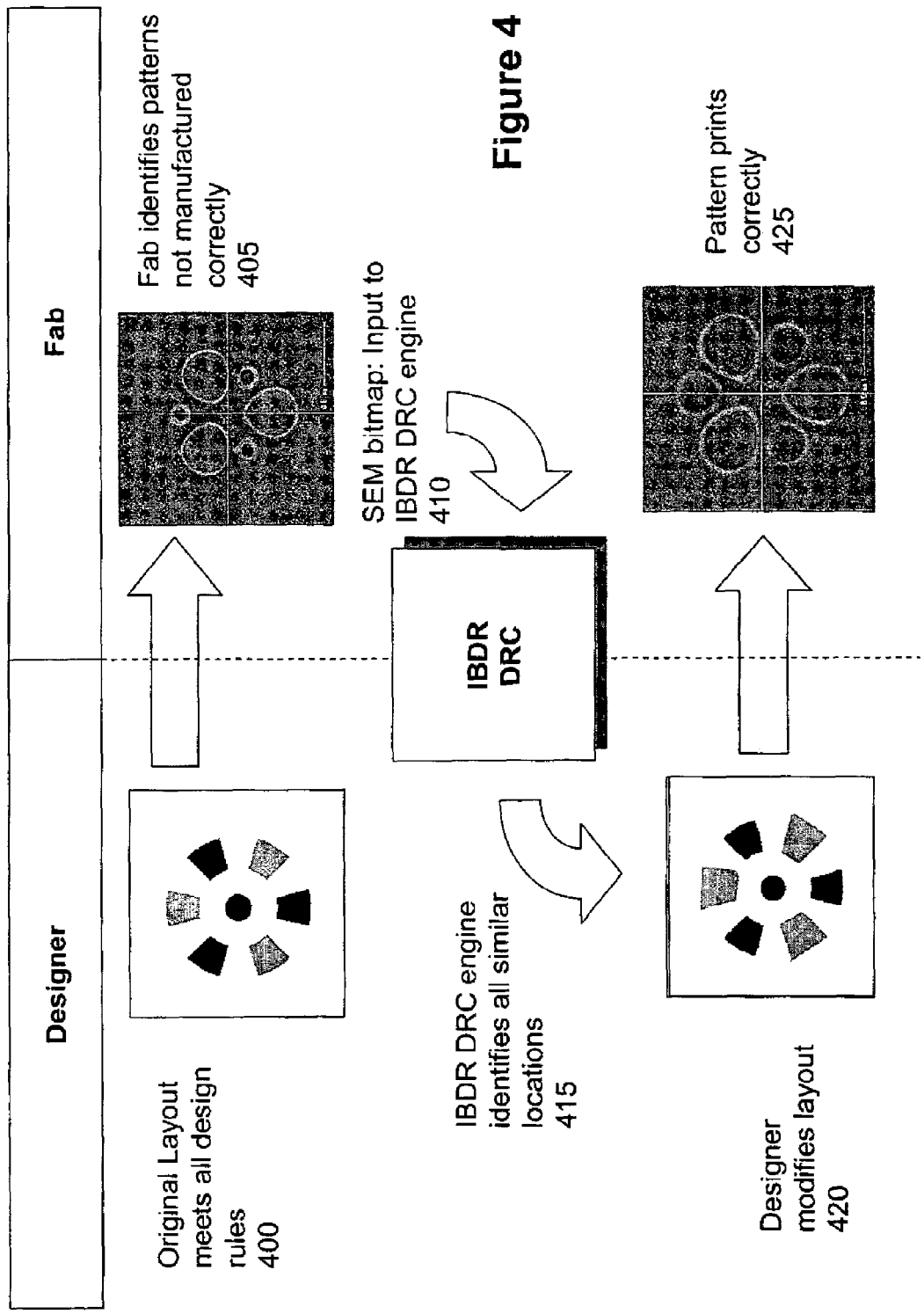
FIG. 4 illustrates diagrammatically one approach to the process flow of developing an image-based design rule in accordance with the present invention.

Referring next to FIG. 4, an overview is shown of an exemplary process for developing an image-based design rule (IBDR) such as might be maintained in the design rules database 345 of FIG. 3. In step 400, a layout which has met all prior design rules is fabricated. The fabricated design can then be checked at step 405 and any patterns not manufactured correctly are identified 405, such as through the use of a scanning electron microscope (SEM). The SEM essentially takes a photo or image of the defective portion(s) of the pattern, which may be in the form of a bitmap or other suitable image format. The bitmap or equivalent image is then added to the database of image-based design rule checks 410. At step 415, the IBDR DRC engine then evaluates the design layout based on all of the IBDR's in the database 345, either in batch or interactive mode, as the result of which the designer modifies the layout at step 420. In the next fab run, the redesigned pattern should print correctly 425. It will be appreciated that multiple iterations may be required to develop a complete set of image-based design rules, but that such design rules, once developed, can be applied across numerous chips to quickly avoid and eliminate problem design elements.

Figure 5:
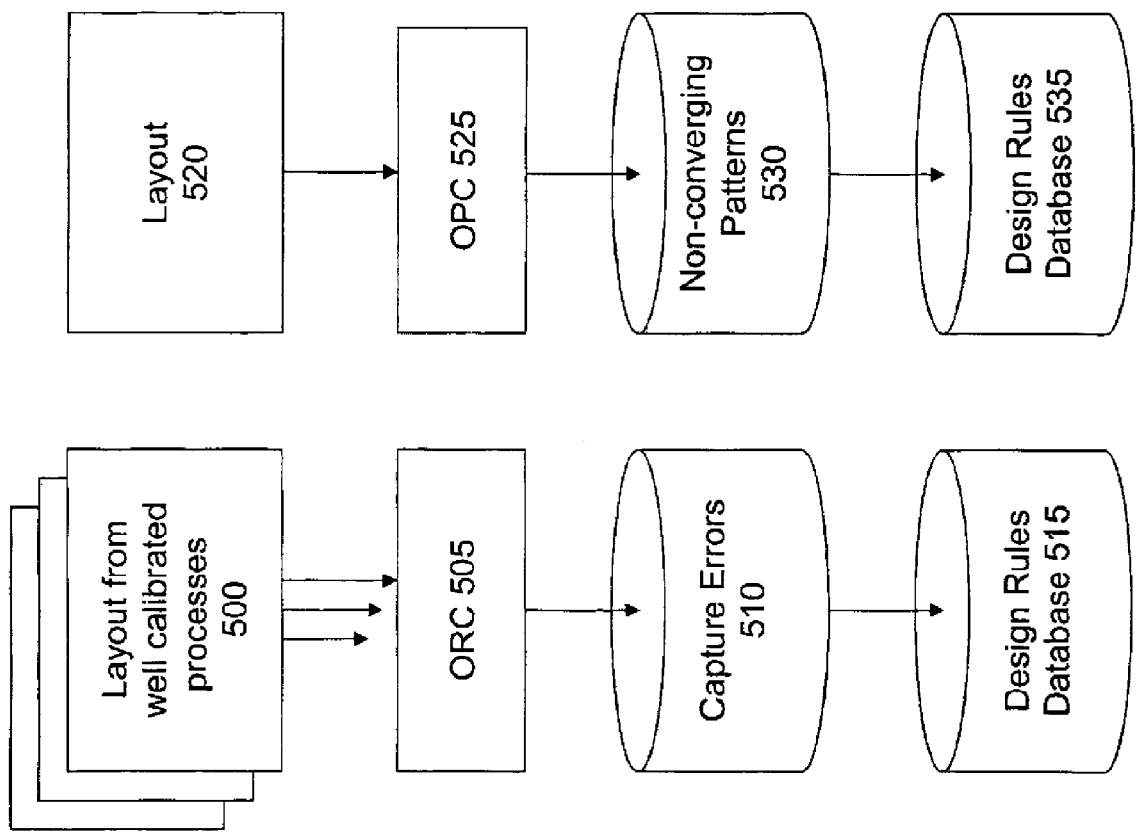
FIG. 5 illustrates diagrammatically another approach to the process flow of developing an image-based design rule based on simulation in accordance with the present invention.

Referring next to FIG. 5, two approaches for extending the IBDR database to capture (i.e., to image) bad patterns are illustrated in process flow form. Whereas FIG. 4 was an example of how IBDRs can be developed through experiment, FIG. 5 shows how IBDRs can be developed through simulation.

In the first approach, as shown starting at step 500, layouts are identified for well characterized processes. Optical rules checks (ORC) can then be performed 505. ORC simulates and predicts the ability of the OPC algorithms to satisfactorily modify the design layout to meet the designer's intent. IC manufacturing errors, called EPEs, or Edge Placement Errors, can be identified. The drawbacks of ORC are that it is highly dependent on the fidelity of the simulation (and hence the importance of a well characterized process) and it occurs late in the design cycle. Locations with unacceptable EPEs can be identified and then captured 510 for later use. These captured bad patterns can be consolidated into the IBDR database 515.

In the second approach, as shown starting at step 520, the layout to be checked is identified. Optical proximity correction (OPC) can be run on this layout 525. It is sometimes the case that OPC cannot iteratively converge to a solution that satisfies all constraints for a global EPE within an acceptable limit. In this case, OPC results in a layout that will not print correctly on the semiconductor. The parts of the layout that do not converge can be identified 530. These parts can then be consolidated into the IBDR database 535.

Figure 6:
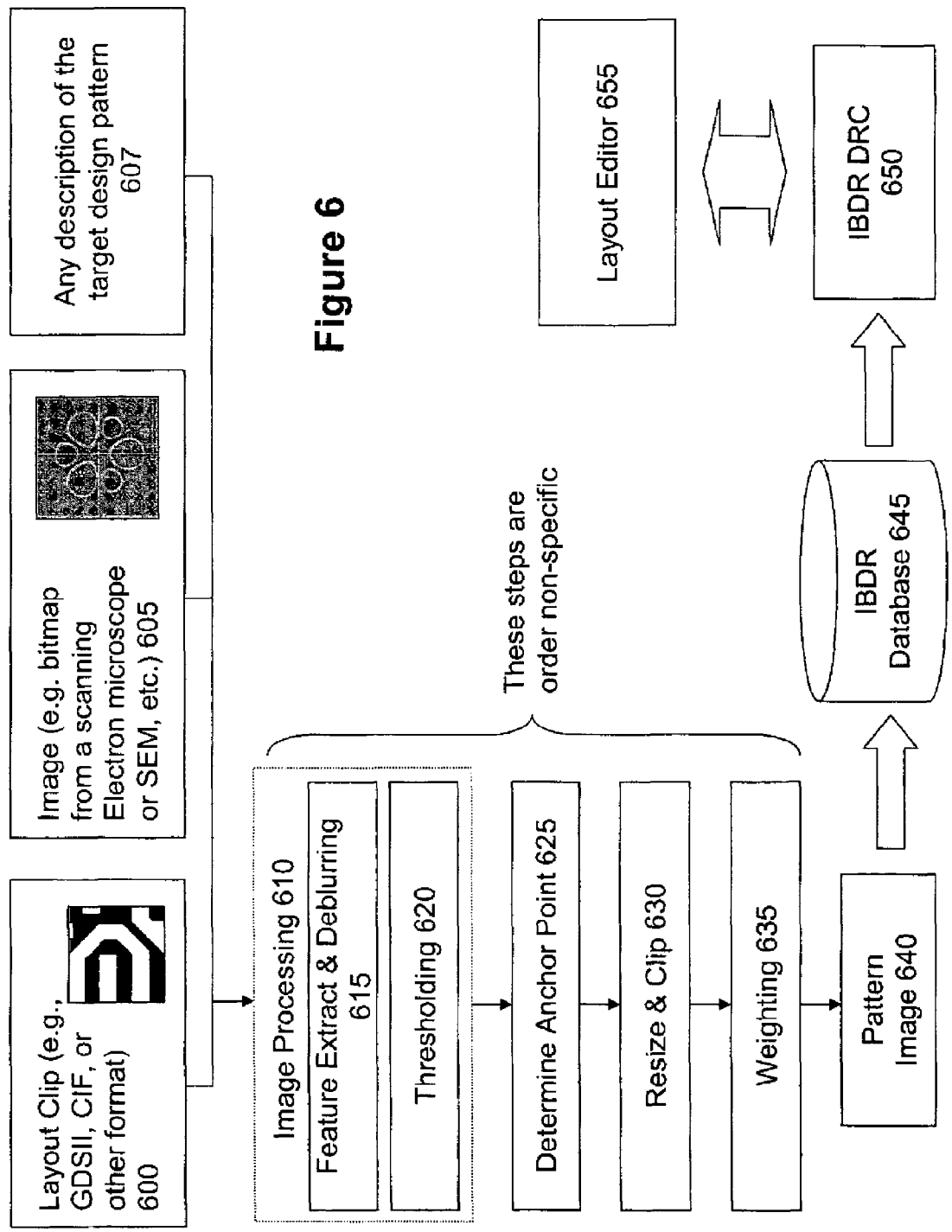
FIG. 6 illustrates in flow diagram form an exemplary process for creating a design rule in accordance with the present invention.

Referring next to FIG. 6, the process for developing an image-based design rule (IBDR) can be appreciated in greater detail. In embodiments of the invention, image-based design rules can be developed, for example, through experiment (as previously discussed), through pre-manufacturing simulation (as previously discussed), or theory. However, in each case, the user might have available an image derived from the portion, or clip, of the design layout stream that represents the area of interest 600. Alternatively, the user might have available image data obtained through use of a scanning electron microscope (SEM) 605 or any other description of the target design pattern 607 (as previously discussed). An image derived from a layout clip can be captured, for example, as a multi-layer layout clip of polygons in a standard layout format such as GDSII, OASIS, CIF, OpenAccess, CDBA, etc., which can be obtained from a layout editor such as Cadence's Virtuoso or other similar product.

The image data, however derived and in whatever format, can then be subjected to image processing 610 (note that steps 610-635 are illustrated in a particular order, but each of these steps can be performed, if at all, in any order the user dictates).

The image processing step 610 can improve a source image either by eliminating extraneous graphical or text overlays, such as may result from a SEM image, to extract the relevant features, or to sharpen a blurry image, as shown at step 615. The image processing step 610 can also sharpen and threshold 620 the image data so that the relevant features may be in high contrast to the background, such as, for example, having the relevant features in white and the background in black.

Next, as shown at step 625, an anchor point can be selected. According to certain embodiments of the invention, the anchor point can be at a defined location relative to the bad pattern image (i.e., the area of interest), such as, for example, at the center or other suitable location that might allow a reference orientation to be identified. In addition, it is desirable in at least some embodiments for the anchor point to lie along a shape corner or line edge, or a certain location relative to a contour (i.e., a shape corner, line edge, etc.) of the bad pattern image, to permit optimized comparison of the anchor point with areas of the pattern being examined. Further, to help in maximizing match factors, certain embodiments might define the anchor points to lie on the gridlines of the layout to which the pattern images being tested can be matched to identify the bad pattern areas.

At step 630, the image can be resized and clipped to place the anchor point at the desired reference point, such as, for example at the center or other pre-selected reference point as discussed above. It will be appreciated by those skilled in the art that, in certain embodiments, it is not necessary to use the same reference point for every image, but rather to know what the reference point is for a particular image. Then, at step 635, the various elements of the image can be assigned a weight. In an exemplary arrangement, the weight is characterized by a color. For example, a feature that should appear in the design (positive correlation) might be assigned a weight of +1 and is represented in white. Such a feature can be searched for in the design. A feature that does not contribute to the target pattern and, thus, will not be looked for in the design might be considered to have a zero correlation and is assigned a 0 weight. Such a feature can be represented in gray. A feature that will be searched for but should be absent might be considered to have a negative correlation and is assigned a −1 weight and can be, for example, represented in black. Where multiple layers are used, as is common for complex semiconductor designs, layer weights can range between the values assigned to black and white, or −1 to +1 in the above example. Weighting schemes can vary, depending on the user's needs, pattern types, and the number of layers being matched.

Once steps 610-635 are complete, the pattern image can be assigned a pattern ID as shown at step 640 and stored in the IBDR database 645 (i.e., step 345 of FIG. 3). The new design rule can then be applied in the next IBDR check 650, leading to the iterative interaction between the layout editor 655 and the IBDR check 650 (as discussed previously).

In certain embodiments of the present invention, multiple two-dimensional (2D) IBDRs can be merged into a single rule using one or more different approaches (or combinations of those approaches). For example, a brute force approach to implementing 2D image-based DRC rules might involve the creation of a rule (or pattern) for every configuration of shapes that suffer from manufacturability problems. The source shapes may come from theory, simulation, test chips, optical proximity correction (OPC) failures, actual production yield limiters, and the like. The number of unique shapes may be very large, resulting in excessive 2D IBDR DRC runtimes and a large volume of result data.

The search space has so far been described as an integrated circuit layout. However, in certain embodiments of the present invention, the systems and methods disclosed herein can be applied to where the search space is a circuit board layout, or other similar layouts.

An IBDR merge method, to help improve runtime and reduce data volume, might include merging similar 2D IBDRs into one common rule that can contain regions of lower importance, which might represent areas in which the source patterns disagree. If more than one final 2D IBDR is desired, then the merge method might be broken into two steps. The first step can be to characterize the rule geometry so that rules can be sorted into groups that have similar features. Such a group might contain patterns where one included shape has a number of slightly different lengths or widths. The second step might involve merging the multiple patterns in each group into one representative pattern for that group that can be used for the actual 2D IBDR DRC runs. This merged pattern may contain gray-scaled geometry, where regions common to a larger number of source patterns have a higher weight.

In a merging example, all source patterns might be added to a destination image to produce a 2D DRC image pattern. Each source pattern can be converted to an image and added to the destination image with a weight, for example, of 1. Each source pattern feature that overlaps a pixel increments the pixel's weight so that in the end each pixel weight can correspond to the number of source images that have features covering that pixel. For N source images, the destination pixels that are in common to all have weights equal to N, any pixels that are not features in any source image can have weights of zero, and all other pixels have weights between 0 and N depending on how many source images have overlapping features at that pixel. The image may then optionally be normalized so that pixels lie in the range [0,1] by dividing all pixel values by N. As will be evident to those skilled in the area, other merge-weighting schemes can be used within the scope of the present invention.

The final 2D DRC rule's image is then added to the DRC deck for use in 2D DRC runs, for example using pattern matching. The match factor at each location is determined by computing the overlap of the gray-scaled 2D DRC pattern with the layout geometry at that feature. If the match factor is above a predefined threshold, then this location is a DRC violation, and it's severity is indicated by the match factor value.

Referring next to the table of FIG. 7, additional features of image-based design rules as implemented in certain embodiments of the invention may be better appreciated. As just discussed, the processed target patterns (or bad patterns) can be stored in the IBDR database so that it can contain as much useful information about each image-based design rule in order to give the designer the best chance to fix known target areas and prevent future problems. Information in the IBDR database can be in the form of layout clips, SEM or other images, and/or text files containing information such as a description of the problem, suggested strategies for improvement, name and contact information of the person who identified the design rule, an so on. In particular, certain embodiments may include a design rule ID 710, an image of the bad pattern 720 and information regarding suggested pattern improvements 730. The design rule ID can be, for example, a sequential integer, alpha-numeric code, or any other unique identifier.

Further, configuration information 740 may be provided in the IBDR database. One element of configuration information may be, for example, match factor threshold. The match factor threshold is a measure of the degree of similarity a given pattern should have for any match operation. The user can, for example, vary this threshold to suit his/her conservatism for various pattern match iterations. Patterns that have been matched, but whose match factor falls below a predetermined threshold are not considered a good match. In certain embodiments, the comparative measure for the match factor threshold can be accomplished using a correlation algorithm. The correlation algorithm can be normalized to a number between −1 and 1 in order to compare the results in a more fair manner. The result can be further normalized to account for layout imperfections such as pixelization, which can limit the result from approaching a perfect match. Other elements of configuration information 740 may be, for example, layer information such as default weights (i.e., which can indicate the importance of various layers) or layer Booleans (i.e., which can describe how multiple layers should be combined before the matching operation). It will be appreciated by those skilled in the art that the configuration information, including the match factor or other metadata, may vary significantly based on the process being used and the user's design constraints.

Figure 8:
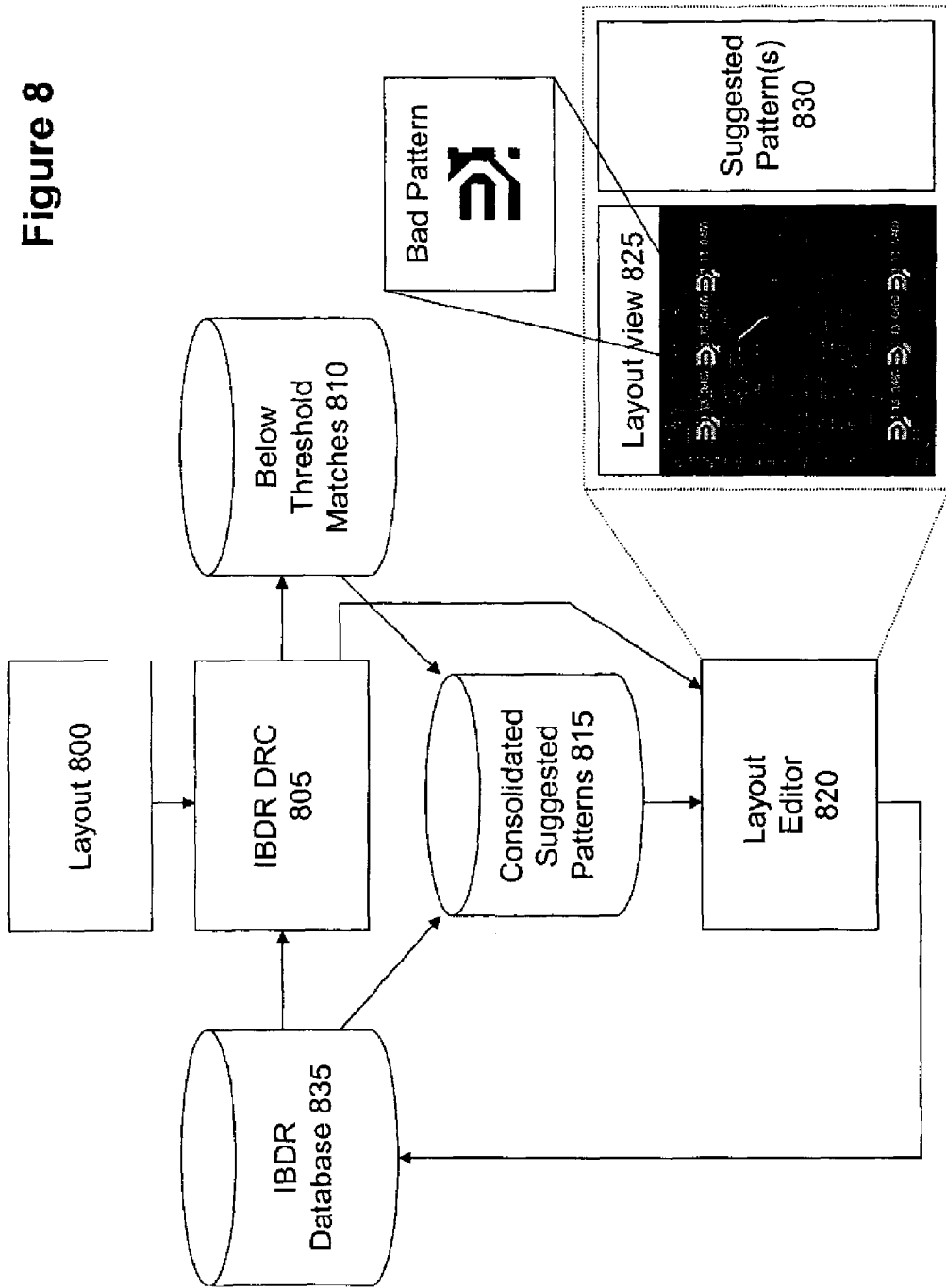
FIG. 8 illustrates in flow diagram form an exemplary process for capturing suggested patterns for inclusion in a design rules database in accordance with the present invention.
Figure 9:
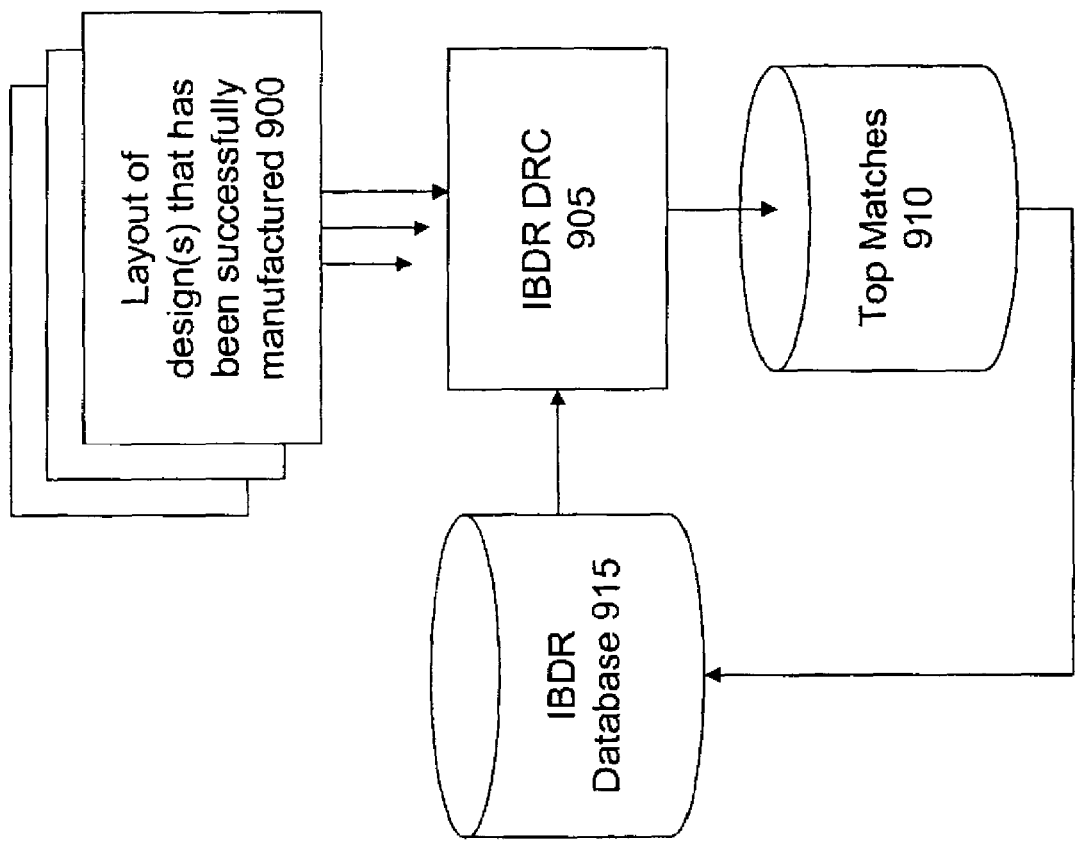
FIG. 9 illustrates in flow diagram form an alternative process to that shown in FIG. 8 for capturing suggested patterns, which may also be used in addition to the process of FIG. 8.

Referring next to FIGS. 8 and 9, two exemplary approaches for extending the IBDR database are illustrated in process-flow form. Referring first to step 800 of FIG. 8, the design layout information (or portion thereof) is provided and an IBDR design rule check is performed 805. Patterns that result in a high match, but are below the match factor threshold, are captured 810 for storage in a consolidated, suggested pattern database, 815. These patterns might constitute potential good patterns that can be used to replace the bad patterns. Then, at step 815, the potential good patterns derived from step 810 can be combined with known good suggested patterns from the design rules database 835 to consolidate the suggested good patterns. In certain embodiments, the "known good" portion of the IBDR database 835 can be seeded with information created by the chip designers who first identified the bad pattern, or others knowledgeable in the area.

Then, either in addition to the prior steps or as an alternative to them, an interactive process may be used as illustrated at step 820. In this iterative process, a layout editor 820 can be used during an interactive DRC, where the layout editor can highlight the DRC errors on the layout. For IBDR DRC errors, the bad pattern can be overlaid on the portion of the layout to which the bad pattern was matched, such as is shown at step 825. A menu of "good" patterns (i.e., either known good patterns and/or suggested good patterns) can then be made available to the chip designer as shown at step 830. The chip designer can either develop his/her own new pattern or select from the menu the suggested patterns, selecting the pattern that best reflects the design intent as a replacement for the bad pattern. The replacement pattern can then be substituted for the bad pattern in the layout stream, advancing the design toward a "DRC Clean" review. Finally, if the replacement pattern was newly developed, the IBDR database can be updated to include the new pattern, as shown at step 835. In this manner, the IBDR database may be iteratively updated to include newly-developed engineering experience and knowledge, allowing the newly-identified good patterns to be used to fix both the current design and future layouts.

Referring next to FIG. 9, a second example of an approach for extending the design rules database is shown in flow diagram form. As shown at step 900, known good layouts can be identified, for example, from designs that have already been successfully manufactured. In at least an exemplary arrangement, IBDR DRC can be performed 905 for each bad pattern on each known good layout. Again, matches with the highest match factors are likely to represent good patterns for the particular design feature because the layout is known to be good (e.g., it has been successfully manufactured). Such matches can be captured and stored 910, and the good patterns can be consolidated into the IBDR database 915 as suggested good patterns. These suggested good patterns may then be used in further review of the tested design, or in any other layout. It will be appreciated by those skilled in the art that many features of different layouts will be the same or very similar, because of the nature of the design and layout tools used. Therefore, the population of the DRC database with suggested good patterns for one design can provide substantial assistance for reviewing other designs.

Design Details

The paragraphs above present an overview of certain embodiments of the invention has been presented with respect to FIGS. 1-9. The paragraphs below present more specific design detail on certain aspects of the certain embodiments.

1. Encoding 2D Design Rules as 2D Images Jar IBDR Check System

As previously discussed, the IBDR check system has at least one 2D image-based design rule. A 2D image-based design rule includes the information that a MDR check system might need in order to perform a search and match. At its simplest, a rule can be just the 2D image representation itself (e.g., a layout clip or image file, etc.), but the rule may also include various other metadata. For example, in order to encode a degree of inexactness for use during a search operation, a user may wish to specify a degree (or threshold) of match. Other types of metadata might include the size of the search pattern or the layer or layers on which a search will be performed. Encoding 2D image-based design rules that include, for example, a search pattern and various metadata will now be described. In the disclosed embodiments, appropriate exemplary default values for the various metadata have been chosen; but it will be apparent to those skilled in the art that the these values can be adjusted to suit the designer's needs.

The search pattern of the IBDR can generally fall into two broad categories: layout clips and image files, these can generally be referred to as a pattern representation of a pattern of interest. Note that there are various other equivalent formats to layout clips and image files, all of which are included within the scope of the present invention. For instance an ASCII list of coordinates and geometries might effectively be the same as a layout clip.

A layout clip can be in a layout format such as, for example, GDSII or OASIS. These formats can encode the dimensions of the various layout features. Note that some formats, such as GDSII, do not have a standard method for specifying a bounding box (i.e., the boundary of the layout clip). In certain embodiments, metadata to describe the bounding box can be provided in the form of a separation (i.e., "padding") between the desired boundaries of the layout clip and the closest layout feature. This padding can be identical all around the layout features or can be individually specified, for example, for the left, right, top, and bottom boundaries of a square layout clip. Note that any suitable layout clip shape and associated boundary shape can be used within the scope of the present invention.

An image file can be in an image format having a file extension such as, for example, PNG or BMP. One item of metadata for an image file can be the scale information, so that the sizes of the features in the image can be extracted. In certain embodiments, the x and y dimension of the image (in nanometers, for example) can be provided. Within the image file, the foreground and background shapes might be distinguished with different choices of colors such as, for example, foreground features as white and background features as black. Another class of image files for certain embodiments of the present invention are those created by a scanning electron microscope (SEM). In general, clean images as from a layout clip work best as a search pattern. Therefore, when the search pattern is an SEM, a two step process might be recommended to create a IBDR from that SEM-identified search pattern. In the first step, a search can be performed with the SEM on the layout. Several good matches are clipped out of the layout and the user (or designer) has the option to select one of the clipped out matches that will work best as the IBDR. This layout clip can then be used to create the IBDR.

In certain embodiments of the present invention, an IBDR can generally fall into two categories: exact and inexact. An exact IBDR is simplest and can describe a specific 2D shape that is a known violation (i.e., known to be bad). At its simplest, an exact IBDR can be a GDSII clip of the shape and all of the metadata can be automatically inferred.

With an inexact IBDR, the match process includes finding locations that are similar to the search pattern. There are various metadata that can be associated with an inexact IBDR and be of aid during the match process, such as, for example, anchor point, weight, threshold, grow-by, and so on.

In certain embodiments of the present invention, the metadata can include an anchor point value. The anchor point can indicate a location in the search pattern that can be used for alignment purposes (i.e., a reference location). As the DRC system scans through the search layout, it can select locations in the search layout, such as, for example, corners or points along an edge, or a certain location relative to a contour of a pattern shape. The anchor point can then be aligned to those locations and the match factor computation can be performed. In this implementation, the anchor point can automatically be selected by searching for the best corner near, for example, the center of the search pattern. The best corner for a rounded edge may be found by fitting a rectangle to the rounded edge and using one of the corners of the fitted rectangle. In one standard situation, the configuration of shapes around a critical feature causes that feature to print incorrectly. Thus, for example, the anchor point could be placed on a corner of the critical feature.

If multiple features are critical, then separate rules may be need to be created for the same search shape, but with different anchor points. In another implementation of the system, multiple anchor points can be selected for a single search shape. As will now be evident to those skilled in the art, the number and location of anchor points can vary according to the requirement of the particular design and desires of the particular designer. Further, an anchor edge may be used either instead of, or in addition to, an anchor point. An anchor edge can be aligned to the edges in the search layout and the match factor computation can be performed. Like anchor points, the number and location of anchor edges can vary according to the requirement(s) of the particular design and the desire(s) of the particular designer. These variations are considered to be within the scope of the present invention.

In certain embodiments, the metadata can include a weight, or weighting factor value. The features of a search pattern can be assigned various weights based upon a particular feature's importance for the match factor calculation. Weights can be used, for example, to differentiate between foreground and background features or between important and unimportant features. In one implementation, all foreground features may be assigned, manually or by default, a weight of +1 and all background features may be assigned, manually or by default, a weight of −1. For one type of inexact matching, the critical feature must exist, but some of the shapes around the critical feature may or may not exist. Regions that are more important can, for example, receive greater weights. For instance, a very important foreground region may have a weight of +10. Completely unimportant regions whose existence is optional can be assigned a weight of 0 to designate a do not care region.

In certain embodiments, the metadata can include a threshold value. The threshold metadata can specify the lower bound for the match factor calculation, above which a result can be considered a match. The threshold may be, for example, an upper bound for match factor calculation, and indicate a non-match. In the lower-bound implementation, the match factor calculation can be normalized to a perfect match so that an actual perfect match can yield a match factor of 1.0. The match factor computation will then yield different values depending on which of the surrounding shapes exist and in which configurations. A threshold of 1.0 indicates that only perfect matches should be identified. In practice, the threshold may be chosen to be less than 1.0 (e.g., 0.99, 0.98, etc.) to allow for the possibility of precision errors during match factor computation.

In certain embodiments, the metadata can include a grow-by value. The grow-by metadata can specify a shape transformation on the search pattern whereby all the edges expand outward by a fixed amount. The area of expansion is thus called the grow-by region. There is further a grow-weight metadata that can specify a weight for the grow-by region. The grow-by transformation can be used to define a region whereby a shape can move (i.e., a translational movement) or to define a region where a shape's edges may vary. For more custom shape transformation, it may be more efficient to modify (i.e., pre-process) the search pattern instead of using more complex grow-by metadata. However, the present invention can include embodiments using more complex grow-by metadata. The match factor may be normalized by the value of a perfect match before or after any grow-by is applied.

In certain embodiments, an inexact design rule can be specified through one or more basic approaches that can include, for example, smart threshold selection and smart shape selection. The smart threshold selection approach can involve picking the right threshold whereby desired similarities can be caught, or matched. The smart shape selection approach can involve manipulating the pattern and metadata (e.g. grow-by, etc.) such that the inexactness can be captured in the search pattern.

In one example of this approach for the via layer, a grow-by can be applied to the search pattern with a grow-weight set to equal that of the foreground features to be search. In this example, the desired behavior might be to find all exact matches as well as cases where the vias have moved a predetermined amount. The predetermined amount can be captured by the grow-by amount. The same analysis can be done for the contact layer. These examples for the via and contact layers leverage the fact that vias and contacts are typically a fixed size; a shift in the edge of a via implies not that the via has grown in size but that the via has undergone a translational movement. In another example of this approach, a grow-by can be applied, but with the grow-weight metadata set to 0. This approach searches for the search pattern, but application of the grow-by with a weight of 0 removes the misalignment penalty.

In certain embodiments of the invention, the degree of match, or match factor, is calculated as an image correlation between the search pattern and shapes in the search layout. In other approaches, the match factor can be calculated with other metrics. One such metric is a feature density value. In certain embodiments of the invention, the user can choose that the match factor be calculated differently in different regions of the search pattern. Rather than searching for a specific feature or for a feature similar to some target, the user may wish to specify that certain regions are of a certain feature density; in other words, that feature density be computed for those regions rather than an image correlation.

FIG. 10A shows an example of a search pattern from, for example, the VIA1 layer. In certain cases, the user may care more about the density of features around the search pattern than about the specific geometry around the search pattern. Certain shapes surrounded by sparse geometry can be harder to print than if surrounded by dense geometry. Referring to FIG. 10B, the user may want to search for the exact geometry in the central black and white region, but only in the case where the surrounding gray region has, for example, a feature density of 10%.

In certain embodiments, the above example can be captured with two pieces of metadata, a target density and a border width. The target density can be an exact density value or a range of density values. The border width can specify the width of a region around the search pattern (e.g. the gray region in FIG. 10B). These special regions can be tagged with either a special layer (if a layout clip) or with a special shade of color (if an image), The mapping of these special tags with target feature density values can be supplied as an additional piece of metadata.

2. Examples of Encoding IBDR 2D IBDRs

In an example of encoding a 2D image-based design rule, the search pattern and metadata can be specified through a configuration file. In the configuration file, a user can create collections of image-based design rules (i.e., called decks or rule decks) or specify only a single design rule. For each IBDR, a user can specify the search pattern and values for the various types of metadata. The source file for the layout clip or image can be supplied by the user (as previously discussed). The metadata can be supplied using "key=value" pairs. If no value is specified by the user for a particular metadata, default values can n be applied. A "key=value" example file is shown below:

Create a deck object and add a design rule into the deck
```
deck=eclair.Deck( )
deck.add(eclair.LayoutPatOpts(eclair.Layout(
filename=layout_clip.gds')
   thresh=0.99,
   backW=-1,
   foreW=1,
   growAmt=100,
   growW=0,
   padding=200
   ))
```

In an example, the search pattern and metadata can be supplied to the image-based design rule checker through the command line. As with the configuration file, users can specify a deck or a single design rule. Further, a user can specify the search pattern and values for the various types of metadata (or use the defaults). A command line example using the same single rule of the configuration file example above is shown below:
runpm-p layout_clip.gds, thresh=0.99, backW=-1, foreW=1, growAmt=100,
   growW=0, padding=200

In an example, the search pattern and metadata can be supplied via a graphical user interface (GUI). The GUI can control the creation of image-based design rules and associated search patterns and metadata. One input to this exemplary GUI can be a design rule search pattern, for example, a layout clip or an image. The search pattern can be automatically converted to an on-screen image and displayed on the user's monitor (i.e., graphically). A user can at this point modify the search pattern as desired and in a myriad of ways. For example, shapes can be added, deleted, or modified. The various metadata options (e,g. padding, grow-by, etc) can also be graphically available to the user. As metadata value choices are made by the user, the impact on the search pattern can be shown graphically. Different weights can be given different colors (i.e., shown graphically to the user), as can be the grow-by region and grow-weight. The anchor point can be automatically selected based on the best corner, but the user can manually select the anchor point (i.e., by overriding the automatic selection or operating in manual mode). The user can commit these changes (e.g., save them in the IBDR database), at which time a new image based design rule can be available for use by the DRC system. Collections of these rules can be aggregated as decks.

An exemplary GUI can also be used to handle images from a scanning electron microscope (SEM). The GUI for handling the use of SEM images (e.g., a SEM Wizard) can control the creation of image-based design rules and associated search patterns and metadata. FIG. 11 illustrates an example of the steps included with the SEM Wizard GUI (note that the particular sequence illustrated for of one or more of these steps is not critical and can occur in another order, or one or more of these steps may be deleted altogether).

In the first step 1110, the SEM Wizard can read a SEM image stored, for example, in a standard image format such as PEG or PUG. Any overlay text, alignment marks, scale bars, or other markings that do not contribute to the printed image data of the SEM can be removed. Likewise, higher quality SEM images (e.g., resolution, contrast, magnification, and the like) are preferable, but are not required for the basic operation of the invention. The SEM image may require pre-processing in an image editor. Specifically, examples of the types of image preprocessing might include clipping the relevant part of the image (i.e., cropping out the irrelevant parts of the image) or resizing the image to a more convenient pixel size. Alternatively, the image editing operations may be performed within the SEM Wizard itself.

In step 1120, a series of filters, such as, for example, Gaussian or other types of blurs, can be applied to the SEM image data to remove measurement noise and single pixel defects. The user may wish to choose from various filters or filter parameters from within the SEM Wizard, or may choose to use a different application or plug-in for the filtering.

In step 1130, the contrast of the SEM image may optionally be improved. This can be accomplished with techniques such as, for example, using histogram equalization (as used in conventional image processing), thresholding, edge sharpening and the like. As with the filtering, the user may wish to choose from various contrast improving techniques from within the SEM Wizard, or may choose to use a different application or plug-in for the contrast adjustments.

In step 1140, an edge detection algorithm can be employed to extract feature contours. More specifically, contour extraction can produce continuous, closed contours representing possible edge locations corresponding to the mask used to print that layer of the chip. The contours can be an approximate representation of the pattern (i.e., collection of shapes) that can be searched for in the target layout. Additional work may be necessary to remove double/multiple contours, to remove excessive non-feature edge contours, to connect broken contours, and/or to properly handle the intersection of contours with the edges of the image. Since handling a variety of different SEM feature edge properties is relatively difficult, some degree of user input may be required such as allowing a user to select contours for inclusion or removal. However, other implementations of this step can be fully-automated.

In step 1150, a region fill operation can be performed to determine which contour-separated regions of the image correspond to foreground geometry and which correspond to background areas. This procedure can color the processed SEM image (e.g. white for feature or black for background), thus, for example, producing a representation similar to a set of polygons resulting from a GDSII layout file pattern. Again, user input may be required, especially to seed the algorithm with the first foreground or background region as the software may have no way of knowing this information. However, the SEM Wizard can be programmed to automatically select a particular region as either fore/background based on known or assumed geometries. Once the first region has been colored, other regions adjacent to a contour line or a known region may be colored oppositely from the known region so that the contour lines separate black image areas from white image areas, and so on. Coloring conflicts resulting from regions adjacent to a region of each color (for example, from contour T-junctions), may be colored heuristically, for example, based on the region opposite the longest contour, or left up to the user to resolve.

In step 1160, the regions can be assigned foreground and/or background weights. For example, foreground pixels (e.g., white areas, in the fill step example above) can be assigned a positive weight and background pixels (e.g., black areas, in the fill step example above) can be assigned a negative weight. However, the weight assignment is flexible as to value, sign and manual/default assignment, so that, for example, foreground regions may be assigned different weights depending on the criticality of the region with respect to the intended match results (e.g., critical foreground regions might be +5, while non-critical foreground areas might only be +1).

In step 1170, one or more anchor points can be selected. The anchor point(s) can be a significant inside and/or outside feature corner near the center of the SEM pattern that can define an origin of the pattern. Anchor point selection may be either automatic or performed by the user through the SEM Wizard.

As shown in step 1180, it might be necessary to reshape the SEM image. This reshaping can include, for example, resizing and/or resampling the image data to convert from pixel coordinates to more usable layout database units such as nanometers (nm). This can be especially true for very large SEM images or large numbers of SEM images that might otherwise require large amounts of memory if represented in their original image size(s). Resampling provides a complex speed vs. memory vs. accuracy tradeoff as resampling can lead to errors in the image representation. The reshaping step can be either automatic or manual and may be performed within the SEM Wizard or through the use of other programs, or a combination thereof.

In step 1190, a number of optional post-processing steps may be applied to the image such as, for example, grow-by, padding, Boolean operations with other image patterns, and the like. These operations can be defined by user-supplied pattern metadata.

This type of approach can be extended to multilayer searches. In one such example, Boolean operations can be performed on the layers to be searched prior to the search. In another approach, the results of two or more rules (i.e., each covering a different layer) can be combined to create a new rule. More generally, scripts can be written to perform more complex queries. These queries may involve multiple searches that may or may not include multiple layers.

3. Method for Creating a Standard DRC from a Layout Clip

For some DRC checks scripts are writing to describe the design rules. While very powerful, the standard DRC scripts are typically not tailored to describe 2D DRC situations. For 2D patterns that can be described as layout clips, converting the GUSH clip into a DRC script automatically enables users to effectively use a GDSII clip as a design rule.

DRC scripts exist in many forms and vary significantly across DRC tools. In certain embodiments of the invention, a simple geometric DRC script based on directions and distances can be employed. First, an edge or corner of a GDSII clip, which can represent the actual critical feature for which the DRC rule was created, can be selected. This feature might serve as the origin of the DRC rule and can be the point at which the DRC error marker is added. After the origin is chosen, all other edges and/or corners can be extracted and used for spacing/distance, length, and direction rules. The script can be written such that each successive rule eliminates some potential violation locations, which do not contain edges that match that particular rule. Any location that passes all required edge distance/direction tests can thus be designated a design rule violation.

Figure 12A:
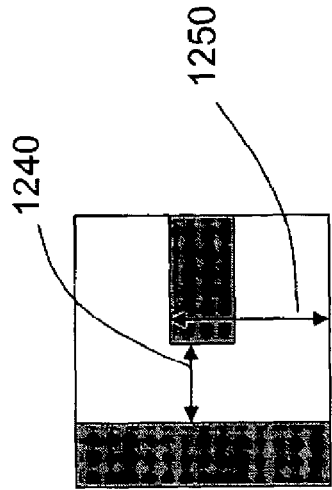
Figure 12B:
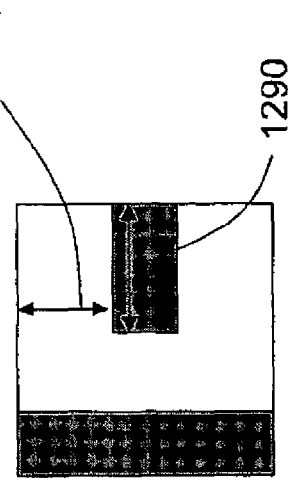
Figure 12C:
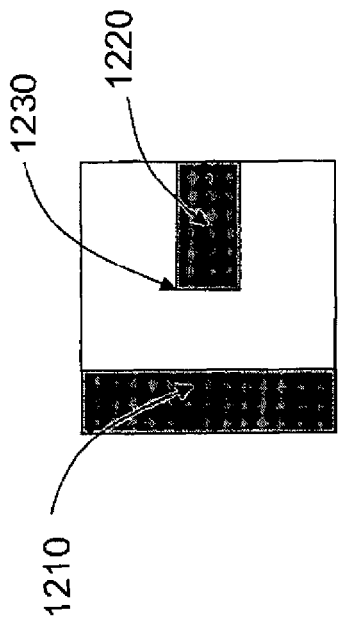
Figure 12D:
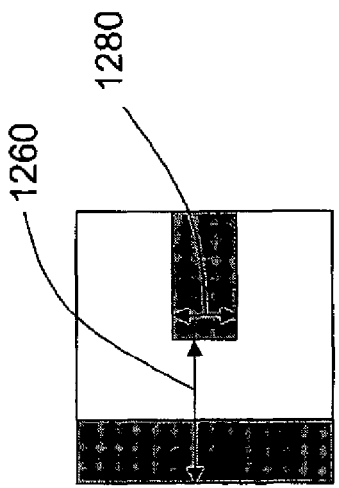

FIGS. 12A-D illustrates possible measurements that can be extracted from a sample layout clip with two shapes shown. As shown in FIG. 12A, an example of layout clip of two shapes is shown, 1210 and 1220, drawn on, for example, the metal1 layer of a device. In this example, the corner 1230 has been chosen as the origin of the DRC IBDR. However, the selection of the origin can be another point of the layout clip. Various dimensions from the origin to all the shape edges can now be extracted. FIG. 12B shows the horizontal separation 1240 between the origin and the right edge of shape 1210. FIG. 1213 also shows the vertical separation 1250 between the origin and the bottom edge of shape 1210. FIG. 12C shows the horizontal separation 1260 between the origin and the left edge of shape 1210. FIG. 12C also shows the vertical separation 1280 between the origin and the bottom of shape 1220. FIG. 12D shows the vertical separation 1270 between the origin and the top edge of shape 1210. FIG. 12D also shows the horizontal separation 1290 between the origin and the right of shape 1220. Once all edges are extracted relative to the origin, then a script can be generated.

An example of a script that can correspond to the layout clip of FIGS. 12A-D is provided below. This script can be run on every pair of shapes in the layout, denoted as, for example, shapeA and shapeB below, to determine if they match the criteria. In the example shown, a criterion has been generated for the distance from each edge in the clip to the origin (1240-1290), and a test can be generated that is the union of the various criteria.

criteria1=space between origin and edge of shapeA boundary==1140
criteria2=space between origin and edge of shapeA boundary==1150
criteria3=space between origin and edge of shapeA boundary==1160
criteria4=space between origin and edge of shapeA boundary==1170
criteria5=space between origin and edge of shapeB boundary==1180
criteria6=space between origin and edge of shapeB boundary==1190
test=criteria1 and criteria2 and criteria3 and criteria4 and criteria5 and criteria6

In this approach, the test has been generated by extracting measurements from the origin to various edges. In another approach, the test can be generated by extracting measurements from the origin to various corners or to a combination of edges and corners.

4. User Interface Output for 2D DRC

One of the challenges involved in a 2D image-based design vile system is the organization of resulting data. In general, and according to certain embodiments of the present invention, a number of user interface components can improve the usability of such a system.

Generally speaking, a 2D DRC system should include a way to graphically highlight matched locations in the search layout; a user might want to quickly jump to, view and/or fix each matched location and/or easily toggle between the various matched locations. One such system might use a layout overlay file. This layout overlay file can be in the same layout format as the search layout (e.g. GDSII, OASIS, etc.). A marker shape can be placed at every found location. Users can access, for example, their layout editor or viewer to merge the results of the overlay file with that of the original search layout file in order to graphically view the matched locations on the original layout. Most simply, the marker might be flat geometry such as a crosshair shape or a rectangle to highlight each matched location. Alternatively, the marker might be a cell that contains the search pattern. The cell can be of the same orientation as the matched location so that the user can easily see how the search pattern compares to the matched layout.

Another graphical, match highlighting system according to this embodiment might be to create a density plot of match locations, for example, with different shades of color indicating a greater density of matches for a given area of interest. This system can allow users to quickly understand which areas of the chip are most affected by the search pattern.

Another graphical, match highlighting system according to this embodiment might allow users to extract the matched locations from the search layout so that further analysis can be Performed on the matched locations; modern layouts can be very large and it can be useful to extract a smaller set of data so that further analysis can be done more quickly and with fewer resources. In such a system, the geometry at the matched locations can be extracted out of the original search layout and placed in a new layout (e.g., clipped or cropped). A user may choose to extract geometry within an additional user-specified distance or region around the matched area. One example of further analysis is simulation: the smaller size of the clipped layout file can enable more rigorous simulation since both the simulation time and memory requirements will be less.

Another graphical, match highlighting system according to this embodiment might create a report on the matching locations. Instead of simplifying the process of browsing the original layout to find results, this exemplary system can simplify the presentation of the data by binning results in various ways. Images of representative matches per bin can be displayed as part of the report so that the user can always have a graphical representation of matches. One useful bin is by degree of match. A refinement of this idea is to further bin by unique situations. Displaying all the possible unique matches can reduce the amount of time a user will need to visit each individual match on the search layout.

In certain embodiments of the invention, the match factor measures a degree of similarity between two configurations of shapes. So far, the match factor has been described in the context of performing a 2D IBDR DRC. However, it can also be used to calculate a critical feature match factor, which can be used to perform a across chip, critical feature variation (AC-CF-V).

Referring to FIG. 13, at step 1300A the user defines a pattern of interest, and at step 1300B identifies a critical feature within that pattern of interest, typically from a layout editor such as GDSII or similar. As shown at step 1305, the user then selects from the master layout a portion, or clip, of that layout that contains the critical feature, for example by using a layout viewer. In an exemplary arrangement, the total area of the clip is determined by the user, and will, for example, generally have dimensions which are larger than the size of the SEM measurements that will be used. For example, the clip may be extracted at roughly twice the size of the SEM to ensure enough overlay on any side to find the optimum match and to account for variations in SEM sizes from multiple measurements. The clip is then saved twice, as two separate layout files, for example in .gds format or similar. In an exemplary arrangement, the coordinates assigned to both clips will remain the same as the coordinates from the master layout, and hereinafter are referred to as pattern A and pattern B, respectively, as indicated at steps 1310 and 1315. An example of such patterns will be discussed hereinafter in connection with FIG. 14.

A weighting is then performed to differentiate pattern A from pattern B. Within pattern A, all features are assigned a value of +1 and the background is assigned a value of 0, as shown at step 1320. In contrast, in pattern B the Critical Feature is assigned a value of +1, but all other elements are assigned a value of 0 whether or not they are features. The CF is thus isolated and identified in pattern B.

In addition, in an exemplary arrangement the user provides configuration information by means of a configuration file as indicated at step 1330. The configuration information may include location of layout clips, SEMs or other files, desired size of SEMs, variations in weighting schemes, desired matching strategies and configurations, desired configuration for output such as graphical or text, and so on.

Then, as shown at step 1335, a plurality of SEM images are prepared, for example by using a CD-SEM programmed to take images of the selected pattern at multiple locations on either the same die, the same wafer, different wafers, or across wafer lots. The SEM images are taken at wafer coordinates which correspond to the critical feature locations in the pattern layout selected at steps 1300A and 1300B.

The SEM images are then processed, including the assignment of an anchor point as shown at step 1340, as well as resizing as shown at step 1345. In an exemplary arrangement, the SEM images are resized to be smaller than patterns A and B, for example about half the size of patterns A and B.

Then, at step 1350, the features of the SEM images are extracted and thresholded, for example to yield a black and white threshold image of the SEM where all pixels falling within a feature are white, and all background area is black. This image is then saved twice, as two separate matrices, referred to hereinafter for convenience as images C and D, shown at steps 1355 and 1360. The difference between images C and D will be the weighting applied to the features (white) and background (black).

Image C is then further processed by assigning a value of +1 to all pixels within features (white), as shown at step 1365. All background pixels (black) are assigned a value of Wb=−Ap/Ab, where Wb is the weight of the background, Ap is the sum of the areas of all white pixels, and Ab is the sum of the areas of all black pixels. It will be appreciated that this exemplary weighting scheme makes the pattern pixels average to zero so that when a match is performed over a large feature with a +1 weighting, the match factors determined by the correlation of images C and D average out to be zero. It will be appreciated that this weighting scheme is just one example of a basic pattern being matched onto a single layer. More complex weighting schemes may be readily implemented given the teachings herein, and will typically depend on the user's needs, pattern type, number of layers involved, and so on.

Within image 13, all pixels within features (white) are assigned a value of +1, while all background pixels (black) are assigned a value of 0, as shown at step 1370.

Then, as shown at step 1375, a first iteration of pattern matching is performed, with the goal of finding the best overlay of the SEM to the layout. In an exemplary arrangement, only pattern A and image C are used in this iteration, and the match location for image C is typically fixed at a single location, referred to as the anchor, which is typically located at the center. For best accuracy, matching is performed on multiple locations in pattern A, although the exact number of match coordinates can vary based on user criteria. The term "coordinate" refers to the position on pattern A that the anchor point of image C is overlaid onto. One or more coordinates with the highest match factor are selected as the best match coordinate(s) ("MF(A/C)"), as shown at step 1380, and will be used in the second iteration of pattern matching. If more than one coordinate has the best match factor, then MF(A/C) is simply a string of those "best match" coordinates.

Next, as shown at step 1385, the second iteration of pattern matching is performed to find the two-dimensional overlay of the SEM image to the user-defined critical feature. The second iteration typically involves only pattern B and image D, and where the coordinates of pattern B are the same as the coordinates of pattern A and the coordinates on image C are the same as the coordinates on image D. Using those coordinates, the "best match" coordinate from the first iteration are used to set up the overlay of pattern B with image D, and a second match factor, MF(B/D) is obtained. This measurement may then be used for statistical comparisons from SEM to SEM. If multiple match locations must be compared due the multiple locations being identified at the end of the first iteration, then an arbitrary number of the highest match factors may be used, for example three. It will be appreciated that each of these match factors will likely be the same or extremely similar.

Referring next to FIG. 14, an example of the first and second iterations from the process of FIG. 13 can be appreciated. Thus, an image C shown at 1400 is overlaid on a pattern A shown at 1405, with the result shown at 1410 where the highest match factor yields the best overlay position. Then, using the coordinates from the image shown at 1410, image D (shown at 1415) is overlaid on pattern B (shown at 1420). However, pattern B has been weighted differently than pattern A, such that only the critical feature stands out in pattern B. In the resulting overly shown at 1425, this allows the critical feature to be matched as shown at 1430. For the particular example shown in FIG. 14, the critical feature match factor can be seen to be 0.73. This critical feature match factor can then be compared to other critical feature match factors across the chip, across the wafer, or across wafers or lots to yield an AC-CF-V.

Referring next to FIG. 15, an alternative to the approach of FIG. 13 is shown. The approach of FIG. 15 differs from that of FIG. 13 in that only one pattern and only one image are used, and only the critical feature is extracted from the layout clip. For the sake of convenience, elements which do not vary from those of FIG. 13 are indicated by the same reference numeral, and are not described again here. At step 1550, the selected pattern is saved, with the weighting already having been performed.

With respect to the SEM image, weighting is performed as in FIG. 13, but at step 1555, after which the image is saved at step 1560. Pattern matching is then performed at step 1565 to find the best overlay position. Then, using the user-identified critical feature within the layout clip (from 1300B), only the critical feature is extracted at step 1570, as shown in FIG. 16 at 1620. The critical feature is isolated by appropriate weighting and thresholding at step 1575, after which the critical feature is convolved with the stored image at step 1480, resulting in a critical feature match factor as shown at step 1585. This may then be used for statistical or other downstream analysis as shown at step 1590.

Referring to FIG. 16, an example of the flow of FIG. 15 is shown, and can be seen to be very similar to that of FIG. 14, with the exception of the second iteration. Instead, in FIG. 16, only the critical feature is extracted, as shown at 1620, and that is compared to the image 1615 to yield the match factor shown at 1625.

It is appreciated that a similar technique may be used to compare how various portions of a critical feature manufacture. This is done simply by increasing the number of match iterations and by weighting the patterns appropriately. For example, the user can not only analyze how a contact's area varies across the wafer, but can also analyze how the four quadrants of that contact vary. For example, most of the variation might be in only one quadrant, implying an orientation-dependent effect in wafer processing.

Although the present invention has been particularly described with reference to embodiments thereof, it should be readily apparent to those of ordinary skill in the art that various changes, modifications, substitutes and deletions are intended within the form and details thereof, without departing from the spirit and scope of the invention. Accordingly, it will be appreciated that in numerous instances some features of the invention will be employed without a corresponding use of other features. Specifically, while the present invention has been described in the embodiments relative to checking, verifying and/or searching an integrated circuit or semiconductor design, those skilled in the art will realize that the image-based matching methods and techniques disclosed can be applicable to any pixel representation for which a search and match are desired. Further, those skilled in the art will understand that variations can be made in the number and arrangement of inventive elements illustrated and described in the above figures. It is intended that the scope of the appended claims include such changes and modifications.

What is claimed is:

1. A computer implemented method for refining a design comprising:
using at least one computer system including at least one processor to perform a process, the process comprising:
defining an image-based design rule (IBDR) that comprises a layout clip or an image of at least a part of an electronic design;
comparing the imaged-based design rule (IBDR) to the electronic design; and
storing a result of the action of comparing the image-based design rule to the electronic design on a non-transitory computer readable storage medium.

2. The computer implemented method of claim 1, wherein the action of defining the image-based design rule includes:
creating a search pattern that is representative of a pattern of interest of the electronic design; and
establishing at least one item of metadata associated with the search pattern.

3. The computer implemented method of claim 2, wherein the search pattern comprises a layout clip.

4. The computer implemented method of claim 2, wherein the search pattern comprises an image file.

5. The computer implemented method of claim 2, wherein the at least one item of metadata is selected from a group of items, the group of items comprising an anchor point, a weight, a padding, a layer, a size, a match factor threshold, a grow-by factor, a smart threshold selection, a smart shape selection and a feature density.

6. The computer implemented method of claim 1, wherein the action of comparing the two-dimensional IBDR to the electronic design includes at least one action selected from a group of actions, the group of actions comprising:
exact-matching the image-based design rule (IBDR) to the electronic design; and
inexact-matching the image-based design rule (IBDR) to the electronic design.

7. The computer implemented method of claim 1, further comprising:
determining or identifying a match factor between the image-based design rule and one or more patterns in the electronic design; and
identifying the one or more patterns that satisfy or dissatisfy the image-based design rule based at least in part upon the match factor.

8. The computer implemented method of claim 7, further comprising:
determining or identifying a threshold value for the match factor that is used to identify the one or more patterns.

9. The computer implemented method of claim 8, further comprising:
normalizing the match factor by using at least a specific match factor.

10. The computer implemented method of claim 9, further comprising:
accounting for a layout imperfection by using one or more match factors that have been normalized with respect to the specific match factor.

11. The computer implemented method of claim 1, further comprising:
encoding one or more features in the electronic design by using the layout clip to provide a padding between a first boundary of the layout clip and a layout feature.

12. The computer implemented method of claim 1, further comprising:
identifying a portion of the electronic design by using at least a result of the action of comparing the image-based design rule to the electronic design.

13. The computer implemented method of claim 1, further comprising:
inferring one or more items of metadata for the image-based design rule by using the layout clip.

14. The computer implemented method of claim 1, further comprising:
identifying at least a portion of the electronic design that satisfies or dissatisfies the two-dimensional image-based design rule based at least in part upon a degree of inexactness between the two-dimensional image-based design rule and the at least a portion of the electronic design.

15. The computer implemented method of claim 1, further comprising:

determining a transformation that transforms at least a portion of the two-dimensional image-based design rule; and identifying one or more patterns in the electronic design that satisfy or dissatisfy the two-dimensional image-based design rule that is transformed by the transformation.

16. The computer implemented method of claim 1, the action of comparing comprising:
   identifying or determining an anchoring geometric feature for the image-based design rule;
   aligning the anchoring geometric feature with a corresponding geometric feature of at least a portion of the electronic design; and
   performing the action of comparing the imaged-based design rule to the electronic design based at least on a result of aligning the anchoring geometric feature with the corresponding geometric feature.

17. The computer implemented method of claim 1, in which the image-based design rule includes the image that is generated by a microscopy device.

18. A computer implemented method, comprising:
   using at least one computer system including at least one processor to perform a process, the process comprising:
   defining a two-dimensional image-based design rule (IBDR) that is associated with at least one item of metadata, wherein the at least one item of metadata is selected from a group of items, the group of items comprising an anchor point, a weight, a padding, a layer, a size, a match factor threshold, a grow-by factor, a smart threshold selection, a smart shape selection, and a feature density; and
   comparing the two-dimensional imaged-based design rule (IBDR) to an electronic design; and
   storing a result of the action of comparing the image-based design rule to the electronic design on a non-transitory computer readable storage medium.

19. The computer implemented method of claim 18, further comprising:
   identifying one or more patterns in the electronic design that satisfy or dissatisfy the two-dimensional image-based design rule based at least in part upon a degree of inexactness between the two-dimensional image-based design rule and the one or more patterns.

20. The computer implemented method of claim 18, further comprising:
   determining a transformation that transforms at least a portion of the two-dimensional image-based design rule; and
   identifying one or more patterns in the electronic design that satisfy or dissatisfy the two-dimensional image-based design rule that is transformed by the transformation.

* * * * *